United States Patent
Dsouza et al.

(10) Patent No.: US 12,524,576 B2
(45) Date of Patent: Jan. 13, 2026

(54) CONTEXT-BASED DATA VALIDATION AND ENTRY

(71) Applicant: MatrixCare, Inc., Bloomington, MN (US)

(72) Inventors: Keegan Duane Dsouza, Ocala, FL (US); Kedar Mangesh Kadam, Nova Scotia (CA); Adhiraj Ganpat Prajapati, St. Paul, MN (US)

(73) Assignee: MatrixCare, Inc., Bloomington, MN (US)

( * ) Notice: Subject to any disclaimer, the term of this patent is extended or adjusted under 35 U.S.C. 154(b) by 219 days.

(21) Appl. No.: 18/168,372

(22) Filed: Feb. 13, 2023

(65) Prior Publication Data
US 2023/0315912 A1    Oct. 5, 2023

Related U.S. Application Data

(60) Provisional application No. 63/325,932, filed on Mar. 31, 2022.

(51) Int. Cl.
| | |
|---|---|
| *G16H 40/20* | (2018.01) |
| *G06F 21/34* | (2013.01) |
| *G06F 21/62* | (2013.01) |
| *G06F 21/64* | (2013.01) |
| *G16H 10/60* | (2018.01) |

(52) U.S. Cl.
CPC .............. *G06F 21/64* (2013.01); *G06F 21/34* (2013.01); *G06F 21/6245* (2013.01); *G16H 10/60* (2018.01); *G16H 40/20* (2018.01)

(58) Field of Classification Search
CPC ........ G16H 40/20; G16H 40/63; G16H 80/00; G16H 40/40; G16H 10/65; G16H 20/00
See application file for complete search history.

(56) References Cited

U.S. PATENT DOCUMENTS

2023/0215530 A1*    7/2023    McNair ................. G16H 10/65
                                                                    235/375

FOREIGN PATENT DOCUMENTS

WO    WO-2020264140 A1 *  12/2020    ............. A61B 5/002

OTHER PUBLICATIONS

Surendran, Doraiswamy, and Murugesan Rohinia. "BLE bluetooth beacon based solution to monitor egress of Alzheimer's disease sufferers from indoors." Procedia Computer Science 165 (2019): 591-597. (Year: 2019).*

* cited by examiner

*Primary Examiner* — Jason B Dunham
*Assistant Examiner* — Constantine Siozopoulos
(74) *Attorney, Agent, or Firm* — Patterson + Sheridan, LLP

(57) ABSTRACT

Techniques for improved data services are provided. A check-in scan indicating a user device in a medical facility is received, and a medical professional associated with the user device is identified. A patient of the medical facility is identified based at least in part on the check-in scan. Access permission of the medical professional is validated, with respect to the patient, based at least in part on the check-in scan. In response to validating the access permission of the medical professional, credentials of the medical professional are not requested, a patient profile of the patient is automatically retrieved via one or more networks, and input describing the patient, from the medical professional, is automatically stored in the patient profile via the one or more networks.

19 Claims, 17 Drawing Sheets

CONTEXT-BASED DATA VALIDATION AND ENTRY

CROSS-REFERENCE TO RELATED APPLICATIONS

This application claims priority to U.S. Provisional Patent Application No. 63/325,932, filed Mar. 31, 2022, the entire content of which is incorporated herein by reference in its entirety.

INTRODUCTION

Embodiments of the present disclosure relate to data retrieval, entry, and validation. More specifically, embodiments of the present disclosure relate to context-based data retrieval and validation.

In a wide variety of medical (and non-medical) settings, medical professionals are often expected to retrieve, review, and/or operate on information for a variety of other users (e.g., patients, or residents in a long-term care facility) quickly and accurately. Additionally, users are often expected to record or otherwise preserve information such as patient updates, indications of the actions they take (e.g., in order to preserve a concrete record of the tasks performed, when they were performed, and who performed them), and the like. For example, nursing staff and other caregivers conventionally record their actions in patient charts. This process is often referred to as "charting." Generally, the users chart any action or task performed, such as assisting a patient to eat, repositioning a patient, cleaning a wound, and the like. However, given the large number of tasks performed by each user, as well as the significant number of patients or residents that are being served, it is generally difficult or impossible to record all such tasks immediately after performing them (e.g., because the user must often continue to another task).

In conventional systems, users must manually identify the patient or resident they are interacting with (e.g., by typing their name or selecting them from a list on a user device) in order to retrieve the patient's data and enter new information. This is a time consuming and cumbersome approach that is prone to inaccuracy (e.g., mistakenly selecting the incorrect patient). As a result of such difficulties, it is common for data to be entered into the incorrect profile, and many users delay charting these actions and information until a later time (e.g., at the end of their work shift), resulting in significant inaccuracies and missed items (e.g., due to forgotten or misremembered tasks). Inaccuracies in these records can have a wide variety of long-reaching impacts.

Improved systems and techniques to identify and retrieve relevant data are needed.

SUMMARY

According to one embodiment presented in this disclosure, a method is provided. The method includes: receiving a check-in scan indicating a user device in a medical facility; identifying a medical professional associated with the user device; identifying a patient of the medical facility based at least in part on the check-in scan; validating access permission of the medical professional, with respect to the patient, based at least in part on the check-in scan; in response to validating the access permission of the medical professional: refraining from requesting credentials of the medical professional; automatically retrieving a patient profile of the patient via one or more networks; and automatically storing input describing the patient, from the medical professional, in the patient profile via the one or more networks.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
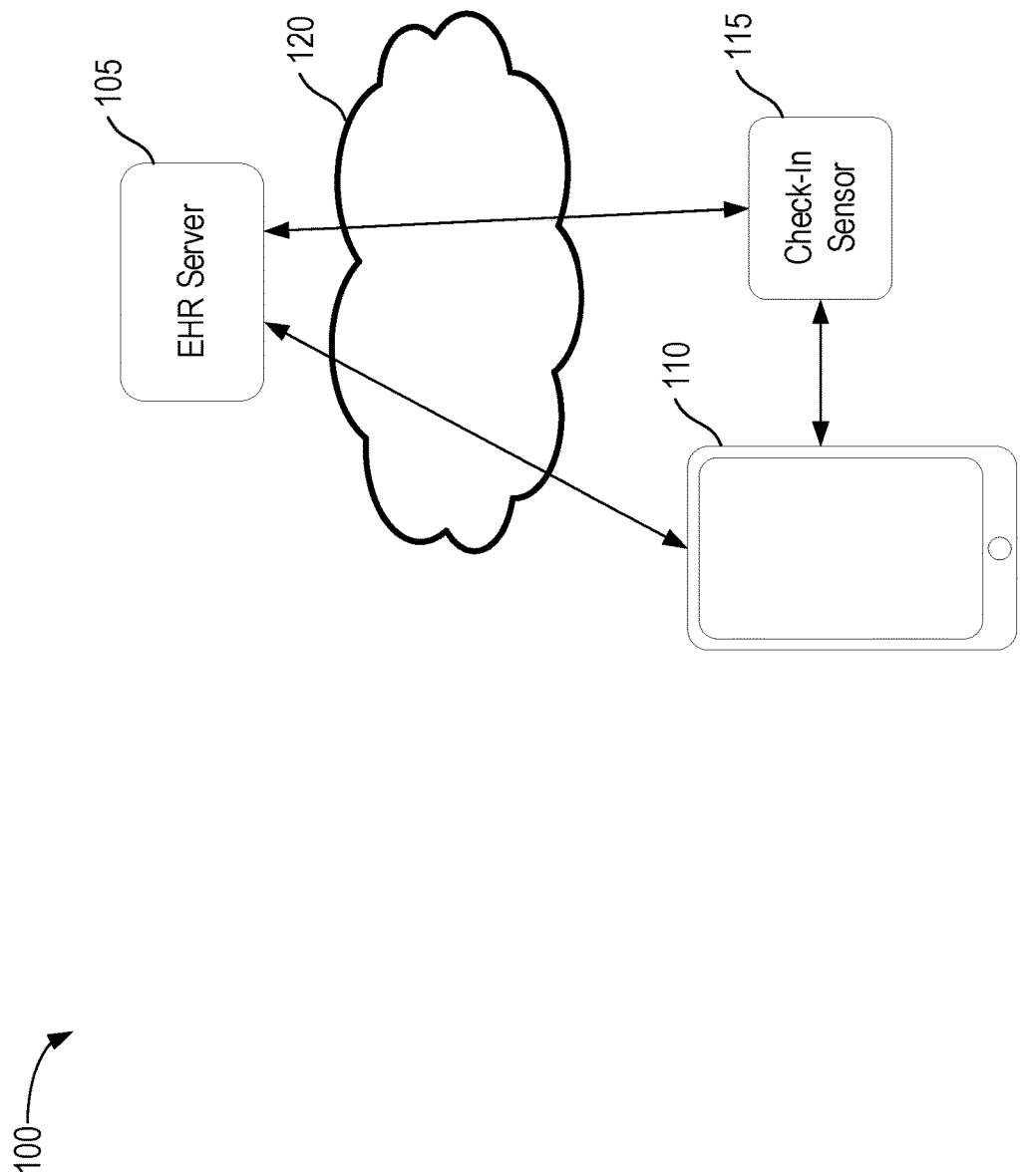
FIG. 1 depicts an example environment for context-based data retrieval and manipulation using a user device.

Aspects of the present disclosure provide apparatuses, methods, processing systems, and computer-readable mediums for improved context-based data services.

Errors in charting (e.g., caused by retrieving and reviewing data for the incorrect patient, saving updates in the incorrect profile, and the like) are a leading cause of negative outcomes in medical and residential settings. In some embodiments of the present disclosure, techniques are provided for context-based data services that can automatically identify and retrieve relevant data based on the context of an encounter (e.g., based on the current location of the user), as well as automatic updating of the data (e.g., updating resident profiles) based on context.

In some embodiments, the system can identify and correlate the location of a user. As used herein, a user can generally include any medical professional, such as a nurse, a caregiver in a residential care facility such as a nursing home, and the like. Based on the user location, the system may automatically retrieve the resident's profile or other information based on that location. As used herein, the resident may be a resident of a care facility, a patient in a medical facility, and the like. In some embodiments, if multiple patients are potentially relevant or proximate to the user, the system can identify and suggest the alternatives, allowing the user to select from a significantly reduced list of options as compared to conventional systems.

In some embodiments, the system can additionally or alternatively validate or authenticate the user without requiring them to manually enter their credentials (e.g., a username and password) such as by having the user hold a badge or other device to a sensor, based on near-field communications (NFC) on the user's device (e.g., on their phone), technology such as radio frequency identification (RFID) on the user's device (e.g., phone or identification card or badge), and the like. In an embodiment, as part of this validation, the system can ensure that the user has access permission to access or interact with the resident, to view the relevant resident information, to modify the resident information, and the like.

For example, in some embodiments, based on the current room the care provider is in (e.g., determined by an NFC scan or check-in, or other sensors), the system will automatically retrieve the profile of the relevant patient (or suggest patients) that reside in the room. In some embodiments, the system can further retrieve the most-likely relevant data as well (e.g., based on the context of the profile, such as recent events, actions, changes in status, and the like with respect to the patient).

In some embodiments, the relevant data is retrieved directly on the user device (e.g., on the smartphone or tablet of the caregiver). For example, the system may detect that the user is in a given space (e.g., a room) in various ways, and output the relevant data on the user's device. In some embodiments, terminals or other devices are used to output the data. For example, the user may scan or check-in in the resident's space (e.g., by tapping a phone or card on a sensor or device in the room, such as on the resident's bed). When the user device is subsequently scanned or checked-in at a terminal (e.g., a desktop computer or wall-mounted computer in the hallway), the system can identify the relevant patient and output the appropriate information.

In some embodiments, a first sensor or device such as a smart watch or ring, an ID card, a phone, and the like can be used to validate or authenticate the user, while another sensor or device can be used to sense or detect the user device. For example, the caregiver can authenticate themselves by performing a check-in scan using their device (e.g., by tapping their phone on a reader or sensor near the door of the room), while another sensor automatically detects that the user is in proximity to the patient, allowing the relevant data to be retrieved.

Example Environment for Data Services Using a User Device

FIG. 1 depicts an example environment 100 for context-based data retrieval and manipulation using a user device. In the illustrated example, the user device 110 is a smartphone. In embodiments, the user device 110 can generally correspond to any sensor or device carried by or used by a user, such as a phone, a tablet, an ID badge or other item with one or more devices embedded (e.g., with RFID capability, NFC capability, and the like), a smartwatch, a smart ring, and the like. In some embodiments, the user associated with the user device 110 is a medical professional, such as a nurse, doctor, healthcare provider or caregiver, and the like. In at least one embodiment, the user is a care provider in a facility where individuals reside and receive care, such as a long-term residential care facility (e.g., a nursing home).

As illustrated, the user device 110 can interact with a check-in sensor 115. The check-in sensor 115 can generally correspond to a wide variety of devices, including active sensors that detect the presence of the user device 110, and/or passive devices that are detected by the user device 110. For example, in one embodiment, the check-in sensor 115 includes an RFID and/or NFC component that detects and identifies the user device 110. In another embodiment, the check-in sensor 115 includes an RFID and/or NFC component that is detected and identified by the user device 110.

In some embodiments, the check-in sensor 115 is associated with a physical space. For example, the check-in sensor 115 may be placed, mounted, or otherwise located near the entrance to a residential room (e.g., next to the doorway). In one such embodiment, the user device 110 may be identified by the check-in sensor 115 as they enter the room (or the user device 110 may identify the check-in sensor 115). For example, the user may walk past the check-in sensor 115 in a proximity that allows for automatic detection and/or the user may scan, tap, or otherwise bring the user device 110 close enough to the check-in device 115 for detection.

In some embodiments, the check-in sensor 115 is alternatively or additionally associated with the user. For example, the check-in sensor 115 may be a smart ring or watch which the user can use to authenticate or otherwise log in to the system via the user device 110.

Generally, the user device 110 and check-in sensor 115 may be used to perform a check-in scan that identifies and/or authenticates the user. For example, prior to providing or outputting any resident information, the system may require the user to login or otherwise authenticate themselves. In one such embodiment, this check-in scan may be used to authenticate the user.

For example, in one such embodiment, the check-in sensor 115 identifies the user device 110, which allows the check-in sensor 115 (or another device, such as the electronic health record (EHR) server 105) to identify the corresponding user associated with the user device 110. In another embodiment, the user device 110 identifies the check-in sensor 115, allowing the user device 110 (or another device, such as the EHR server 105) to identify the user associated with the check-in sensor 115. Based on this identity, the system can determine whether the user has access permissions (either in general, or with respect to the specific resident as discussed in more detail below).

Advantageously, this allows the system to automatically authenticate or validate the user, such that they need not manually enter any credentials. This can reduce the time needed to authenticate, as well as reduce network congestion (e.g., because the user need not send their login credentials repeatedly).

In the illustrated example, the user device 110 and check-in sensor 115 can be communicatively coupled to one or more remote systems, such as an EHR server 105, via a network 120. In some embodiments, the EHR server 105 performs the user validation or authentication based on the indicated data. The network 120 can generally include one or more communications networks, and may include wired networks, wireless networks, or a combination of wired and wireless networks. In at least one embodiment, the network 120 can include the Internet. Although the illustrated example depicts both the user device 110 and check-in sensor 115 being communicatively coupled with the EHR server 105, in some embodiments, one or both of the devices (e.g., the user device 110 or check-in sensor 115) may lack such capability. For example, the user device 110 may report the detected check-in sensor 115 to the EHR server 105, while the check-in sensor 115 does not perform such communications. Alternatively, the check-in sensor 115 may report the detected user device 110, while the user device 110 does not perform such communications.

In at least one embodiment, each of the devices can report the information, allowing the EHR server 105 to verify the data. For example, the user device 110 may report the identity of the check-in sensor 115, and the check-in sensor 115 may report the identity of the user device 110. This can allow the EHR server 105 to match the identifications and confirm, validate, or authenticate the check-in scan (e.g., confirming that the user device 110 is in the indicated location with the corresponding check-in sensor 115).

The EHR server 105 is generally configured to maintain information, such as electronic health records (EHR), related to one or more individuals (referred to in some aspects as residents or patients). For example, the EHR server 105 may maintain a respective resident profile for each resident in a residential facility. In embodiments, the operations of the EHR server 105 may be implemented using hardware, software, or a combination of hardware and software. The EHR server 105 can generally reside in any suitable location where it can be communicably linked with the user device 110 and/or check-in sensor 115. For example, the EHR server 105 may be located on-premises at the residential facility, at a centralized location (which may serve multiple facilities), in the cloud, and the like.

In an embodiment, once the user has been authenticated (as discussed in more detail below), the EHR server 105 can retrieve and return the relevant resident data. For example, if the check-in sensor 115 is associated with a given resident (e.g., because it is located in the resident's room or is carried by or worn by the resident), the EHR server 105 can authenticate that the user (associated with the user device 110) is authorized to access the resident's data, and return the resident profile.

In an embodiment, this validation, data retrieval, and output can be performed automatically and without manual effort or input from the user. That is, the user need not manually identify or authenticate themselves (e.g., by providing credentials), and need not select or otherwise indicate the specific resident. This can significantly reduce errors or mistakes, as well as reduce the time required to identify and retrieve the relevant data. As discussed above, this significantly improves resident outcomes, as reduced errors generally result in improved care. Further, the workload on the system can be reduced. For example, conventional systems may require the user to manually authenticate themselves each time they enter a resident's room, which requires repeated communications over the network 120. Using aspects of the present disclosure, however, the need for this communication is reduced, thereby improving the operations and capacity of the system and network.

In some embodiments, the system can additionally receive and automatically curate input from users (e.g., via the user device 110). For example, in one embodiment, once the resident profile has been output to the user, the user may indicate updates such as current vitals, progress notes, actions taken, and the like. The EHR server 105 may then automatically store these updates in the relevant portion(s) of the resident profile without requiring further manual effort. For example, the EHR server 105 may determine the current context (e.g., recent actions and events), and store updates accordingly. As one example, if the EHR server 105 determines that the resident recently underwent surgery and the received data is a progress note, the EHR server 105 may automatically input the note in the portion of the resident profile that relates to the surgery (or may prompt the user to confirm that the input should be associated with the surgery information).

Example Environment for Data Services Using a Resident Device

Figure 2:
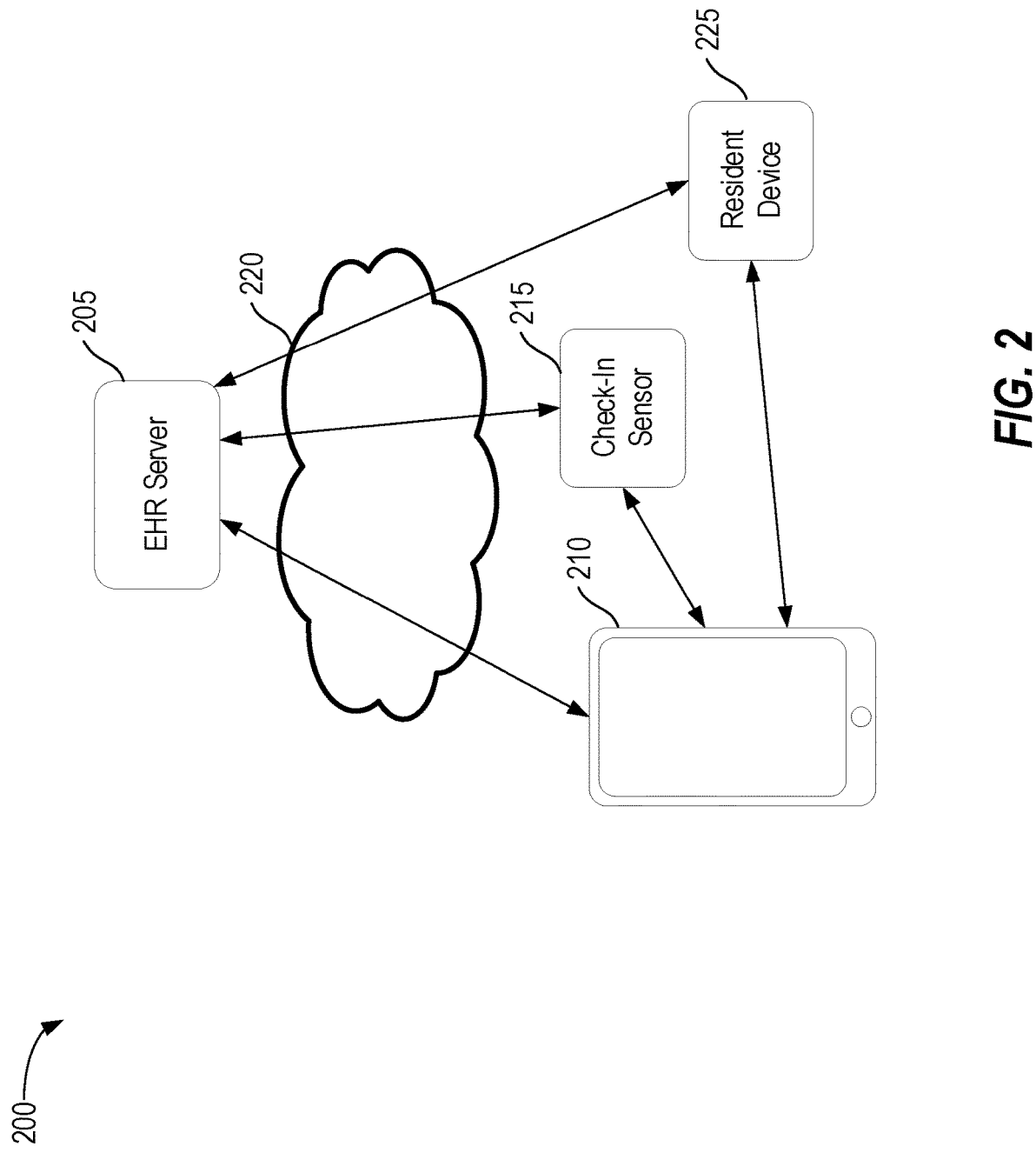
FIG. 2 depicts an example environment for context-based data retrieval and manipulation using a resident device.

FIG. 2 depicts an example environment 200 for context-based data retrieval and manipulation using a resident device (also referred to as a patient device in some aspects).

In the illustrated example, the user device 210 is a smartphone. In embodiments, as discussed above, the user device 210 can generally correspond to any sensor or device carried by or used by a user, such as a phone, a tablet, an ID badge or other item with one or more devices embedded (e.g., with RFID capability, NFC capability, and the like), a smartwatch, a smart ring, and the like. In some embodiments, the user associated with the user device 210 is a healthcare provider or caregiver, such as a nurse or doctor. In at least one embodiment, the user is a care provider in a facility where individuals reside and receive care, such as a long-term residential care facility (e.g., a nursing home). In some embodiments, the user device 210 corresponds to the user device 110 of FIG. 1.

As illustrated, the user device 210 can interact with a check-in sensor 215. The check-in sensor 215 can generally correspond to a wide variety of devices, including active sensors that detect the presence of the user device 210, and/or passive devices that are detected by the user device 210. For example, in one embodiment, the check-in sensor 215 includes an RFID and/or NFC component that detects and identifies the user device 210. In another embodiment, the check-in sensor 215 includes an RFID and/or NFC component that is detected and identified by the user device 210. In some embodiments, the check-in sensor 215 corresponds to the check-in sensor 115 of FIG. 1.

In some embodiments, the check-in sensor 215 is associated with a physical space. For example, the check-in sensor 215 may be placed, mounted, or otherwise located near the entrance to a residential room (e.g., next to the doorway). In one such embodiment, the user device 210 may be identified by the check-in sensor 215 as they enter the room (or the user device 210 may identify the check-in sensor 215). For example, the user may walk past the check-in sensor 215 in a proximity that allows for automatic detection and/or the user may scan, tap, or otherwise bring the user device 210 close enough to the check-in device 215 for detection.

In some embodiments, the check-in sensor 215 is alternatively or additionally associated with the user. For example, the check-in sensor 215 may be a smart ring or watch which the user can use to authenticate or otherwise log in to the system via the user device 210.

Generally, the user device 210 and check-in sensor 215 may be used to perform a check-in scan that identifies and/or authenticates the user. For example, prior to providing or outputting any resident information, the system may require the user to login or otherwise authenticate themselves. In one such embodiment, this check-in scan may be used to authenticate the user.

For example, in one such embodiment, the check-in sensor 215 identifies the user device 210, which allows the check-in sensor 215 (or another device, such as the EHR server 205) to identify the corresponding user associated with the user device 210. In another embodiment, the user device 210 identifies the check-in sensor 215, allowing the user device 210 (or another device, such as the EHR server 205) to identify the user associated with the check-in sensor 215. Based on this identity, the system can determine whether the user has access permissions (either in general, or with respect to the specific resident as discussed in more detail below).

Advantageously, this allows the system to automatically authenticate or validate the user, such that they need not manually enter any credentials. This can reduce the time needed to authenticate, as well as reduce network congestion (e.g., because the user need not send their login credentials repeatedly).

In depicted example, the environment 200 also includes a resident device 225. The resident device 225 can generally correspond to any sensor or device that is worn by, carried by, used by, or is otherwise associated with a resident, such as a phone, a tablet, an ID badge or other item with one or more devices embedded (e.g., with RFID capability, NFC capability, and the like), a smartwatch, a smart ring, embedded or attached to an item associated with the resident (e.g., their bed) and the like, and the like.

In some embodiments, the resident device 225 can include one or more active sensors that detect the presence of the user device 210, and/or one or more passive devices that are detected by the user device 210. For example, in one embodiment, the resident device 225 includes an RFID and/or NFC component that detects and identifies the user device 210. In another embodiment, the resident device 225 includes an RFID and/or NFC component that is detected and identified by the user device 210.

In some embodiments, the resident device 225 is associated with a physical space. For example, the resident device 225 may be placed, mounted, or otherwise located in a residential room (e.g., next to the doorway, or attached to the bed of the resident). In one such embodiment, the user device 210 may be identified by the resident device 225 as the user comes within a defined proximity from the bed (or the user device 210 may identify the resident device 225). For example, the user may walk past or stand near the resident device 225 in a proximity that allows for automatic detection and/or the user may scan, tap, or otherwise bring the user device 210 close enough to the resident device 225 for detection. In some embodiments, the resident associated with the resident device 225 is a patient or resident in a facility where individuals reside and receive care, such as a long-term residential care facility (e.g., a nursing home).

As illustrated, the user device 210 can interact with a resident device 225 in a similar manner to the check-in sensor 215. For example, the user device 210 may detect and/or identify the resident device 225 (e.g., determining a resident identifier or device identifier), which can then be used to identify the corresponding resident (e.g., based on a mapping of resident devices to residents and/or a mapping of physical spaces to residents). Additionally or alternatively, the resident device 225 may detect and/or identify the user device 210 (e.g., determining a user identifier or device identifier), which can then be used to identify the corresponding user (e.g., based on a mapping of resident devices to residents and/or a mapping of physical spaces to residents).

In some embodiments, the check-in sensor 215 is used to provide authentication or validation of the user, as discussed above, while the resident device 225 is used to uniquely identify the relevant resident that the user is interacting with. For example, the user may scan the check-in sensor 215 upon entering the resident's room. The user device 110 may then scan or detect (or be scanned or detected by) the resident device 225. This allows the user device 210 and/or EHR server 205 to identify both the user (e.g., the caregiver) and the resident involved in the interaction.

In the illustrated example, the user device 210, check-in sensor 215, and/or resident device 225 can be communicatively coupled to one or more remote systems, such as an EHR server 205, via a network 220. In some embodiments, the EHR server 205 performs the user validation or authentication based on the indicated data. In some embodiments, the EHR server 205 corresponds to the EHR server 105 of FIG. 1.

The network 220 can generally include one or more communications networks, and may include wired networks, wireless networks, or a combination of wired and wireless networks. In at least one embodiment, the network 220 can include the Internet. Although the illustrated example depicts the user device 210, check-in sensor 215, and resident device 225 being communicatively coupled with the EHR server 205, in some embodiments, some or all of the devices may lack such capability. For example, as discussed above, the user device 210 may report the detected check-in sensor 215 to the EHR server 205, while the check-in sensor 215 does not perform such communications. Similarly, the user device 210 may report the detected resident device 225, while the resident device 225 does not perform such communications. Additionally or alternatively, the resident device 225 may report the detected user device 210.

In at least one embodiment, each of the devices can report the information, allowing the EHR server 205 to verify the data. For example, the user device 210 may report the identity of the check-in sensor 215, and the check-in sensor 215 may report the identity of the user device 210. This can allow the EHR server 205 to match the identifications and confirm, validate, or authenticate the check-in scan (e.g., confirming that the user device 210 is in the indicated location with the corresponding check-in sensor 215). Similarly, the user device 210 may report the identity of the resident device 225, and the resident device 225 may report the identity of the user device 210. This can allow the EHR server 205 to similarly match the identifications and confirm, validate, or authenticate that the user device 210 is in the indicated location with the corresponding resident device 225.

The EHR server 205 is generally configured to maintain information, such as electronic health records (EHR), related to one or more individuals (referred to in some aspects as residents or patients). For example, the EHR server 205 may maintain a respective resident profile for each resident in a residential facility. In embodiments, the operations of the EHR server 205 may be implemented using hardware, software, or a combination of hardware and software. The EHR server 205 can generally reside in any suitable location where it can be communicably linked with the user device 210, check-in sensor 215, and/or resident device 225. For example, the EHR server 205 may be located on-premises at the residential facility, at a centralized location (which may serve multiple facilities), in the cloud, and the like.

In an embodiment, once the user has been authenticated (e.g., via the check-in scan reported by the user device 210 and/or check-in sensor 215), the EHR server 205 can retrieve and return the relevant resident data based on the resident device 225. For example, if the resident device 225 is associated with a given physical location (e.g., because it is located in the resident's room), the EHR server 205 can retrieve and evaluate a mapping of physical spaces and resident devices and residents, thereby determining which physical space corresponds to the indicated resident device 225, and which resident resides in the determined space.

As another example, if the resident device 225 is associated with a specific resident (e.g., because it is worn or carried by the resident), the EHR server 205 can retrieve and evaluate a mapping of resident devices and residents, thereby determining which resident corresponds to the indicated resident device 225.

In some embodiments, as discussed above, the validation performed by the EHR server 205 can further include confirming that the user (associated with the user device 210) is authorized to interact with, view information for, modify the profile of, or otherwise access the resident and/or resident data. For example, the EHR server 205 (or another device) may evaluate staffing records or other information to confirm whether the user is an authorized user that serves the identified resident.

In some embodiments, this validation, data retrieval, and output can be performed automatically and without manual effort or input from the user. That is, the user need not manually identify or authenticate themselves (e.g., by providing credentials), and need not select or otherwise indicate the specific resident. This can significantly reduce errors or mistakes, as well as reduce the time required to identify and retrieve the relevant data. As discussed above, this significantly improves resident outcomes, as reduced errors generally result in improved care. Further, the workload on the system can be reduced. For example, conventional systems may require the user to manually authenticate themselves each time they enter a resident's room, which requires repeated communications over the network 220. Using aspects of the present disclosure, however, the need for this communication is reduced, thereby improving the operations and capacity of the system and network. Similarly, conventional systems require the user to manually identify the appropriate resident, which is tedious and error-prone. Using aspects of the present disclosure, the resident is automatically identified, resulting in reduced error and improved care to the resident.

In some embodiments, the system can additionally receive and automatically curate input from users (e.g., via the user device 210). For example, in one embodiment, once the resident profile has been output to the user, the user may indicate updates such as current vitals, progress notes, actions taken, and the like. The EHR server 205 may then automatically store these updates in the relevant portion(s) of the resident profile without requiring further manual effort. For example, the EHR server 205 may determine the current context (e.g., recent actions and events), and store updates accordingly. As one example, if the EHR server 205 determines that the resident recently underwent surgery and the received data is a progress note, the EHR server 205 may automatically input the note in the portion of the resident profile that relates to the surgery (or may prompt the user to confirm that the input should be associated with the surgery information).

Example Environment for Data Services Using a Terminal

Figure 3:
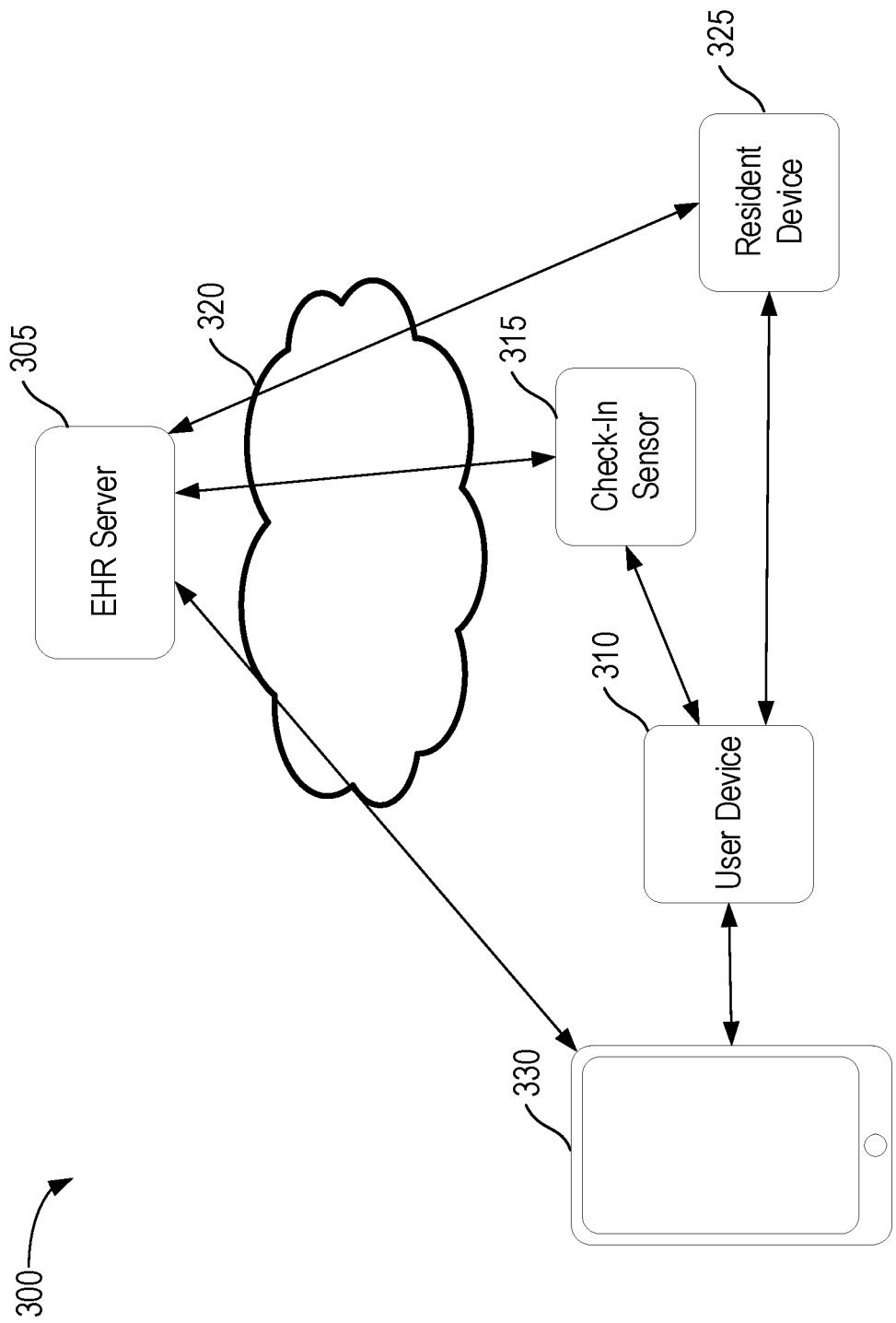
FIG. 3 depicts an example environment for context-based data retrieval and manipulation using a terminal.

FIG. 3 depicts an example environment 300 for context-based data retrieval and manipulation using a terminal.

In the illustrated example, the user device 310 is a smartphone. In embodiments, as discussed above, the user device 310 can generally correspond to any sensor or device carried by or used by a user, such as a phone, a tablet, an ID badge or other item with one or more devices embedded (e.g., with RFID capability, NFC capability, and the like), a smartwatch, a smart ring, and the like. In some embodiments, the user associated with the user device 310 is a healthcare provider or caregiver, such as a nurse or doctor. In at least one embodiment, the user is a care provider in a facility where individuals reside and receive care, such as a long-term residential care facility (e.g., a nursing home). In some embodiments, the user device 310 corresponds to the user device 110 of FIG. 1 and/or the user device 210 of FIG. 2.

As illustrated, the user device 310 can interact with a check-in sensor 315. The check-in sensor 315 can generally correspond to a wide variety of devices, including active sensors that detect the presence of the user device 310, and/or passive devices that are detected by the user device 310. For example, in one embodiment, the check-in sensor 315 includes an RFID and/or NFC component that detects and identifies the user device 310. In another embodiment, the check-in sensor 315 includes an RFID and/or NFC component that is detected and identified by the user device 310. In some embodiments, the check-in sensor 315 corresponds to the check-in sensor 115 of FIG. 1 and/or the check-in sensor 215 of FIG. 2.

In some embodiments, the check-in sensor 315 is associated with a physical space. For example, the check-in sensor 315 may be placed, mounted, or otherwise located near the entrance to a residential room (e.g., next to the doorway). In one such embodiment, the user device 310 may be identified by the check-in sensor 315 as they enter the room (or the user device 310 may identify the check-in sensor 315). For example, the user may walk past the check-in sensor 315 in a proximity that allows for automatic detection and/or the user may scan, tap, or otherwise bring the user device 310 close enough to the check-in device 315 for detection.

In some embodiments, the check-in sensor 315 is alternatively or additionally associated with the user. For example, the check-in sensor 315 may be a smart ring or watch which the user can use to authenticate or otherwise log in to the system via the user device 310.

Generally, the user device 310 and check-in sensor 315 may be used to perform a check-in scan that identifies and/or authenticates the user. For example, prior to providing or outputting any resident information, the system may require the user to login or otherwise authenticate themselves. In one such embodiment, this check-in scan may be used to authenticate the user.

For example, in one such embodiment, the check-in sensor 315 identifies the user device 310, which allows the check-in sensor 315 (or another device, such as the EHR server 305) to identify the corresponding user associated with the user device 310. In another embodiment, the user device 310 identifies the check-in sensor 315, allowing the user device 310 (or another device, such as the EHR server 305) to identify the user associated with the check-in sensor 315. Based on this identity, the system can determine whether the user has access permissions (either in general, or with respect to the specific resident as discussed in more detail below).

Advantageously, this allows the system to automatically authenticate or validate the user, such that they need not manually enter any credentials. This can reduce the time needed to authenticate, as well as reduce network congestion (e.g., because the user need not send their login credentials repeatedly).

In depicted example, the environment 300 also includes a resident device 325. The resident device 325 can generally correspond to any sensor or device that is worn by, carried by, used by, or is otherwise associated with a resident, such as a phone, a tablet, an ID badge or other item with one or more devices embedded (e.g., with RFID capability, NFC capability, and the like), a smartwatch, a smart ring, embedded or attached to an item associated with the resident (e.g., their bed) and the like. In some embodiments, the resident device 325 corresponds to the resident device 225 of FIG. 2.

In some embodiments, the resident device 325 can include one or more active sensors that detect the presence of the user device 310, and/or one or more passive devices that are detected by the user device 310. For example, in one embodiment, the resident device 325 includes an RFID and/or NFC component that detects and identifies the user device 310. In another embodiment, the resident device 325 includes an RFID and/or NFC component that is detected and identified by the user device 310.

In some embodiments, the resident device 325 is associated with a physical space. For example, the resident device 325 may be placed, mounted, or otherwise located in a residential room (e.g., next to the doorway, or attached to the bed of the resident). In one such embodiment, the user device 310 may be identified by the resident device 325 as the user comes within a defined proximity from the bed (or the user device 310 may identify the resident device 325). For example, the user may walk past or stand near the resident device 325 in a proximity that allows for automatic detection and/or the user may scan, tap, or otherwise bring the user device 310 close enough to the resident device 325 for detection. In some embodiments, the resident associated with the resident device 325 is a patient or resident in a facility where individuals reside and receive care, such as a long-term residential care facility (e.g., a nursing home).

As illustrated, the user device 310 can interact with a resident device 325 in a similar manner to the check-in sensor 315. For example, the user device 310 may detect and/or identify the resident device 325 (e.g., determining a resident identifier or device identifier), which can then be used to identify the corresponding resident (e.g., based on a mapping of resident devices to residents and/or a mapping of physical spaces to residents). Additionally or alternatively, the resident device 325 may detect and/or identify the user device 310 (e.g., determining a user identifier or device identifier), which can then be used to identify the corresponding user (e.g., based on a mapping of resident devices to residents and/or a mapping of physical spaces to residents).

In some embodiments, the check-in sensor 315 is used to provide authentication or validation of the user, as discussed above, while the resident device 325 is used to uniquely identify the relevant resident that the user is interacting with. For example, the user may scan the check-in sensor 315 upon entering the resident's room. The user device 110 may then scan or detect (or be scanned or detected by) the resident device 325. This allows the user device 310 and/or EHR server 305 to identify both the user (e.g., the caregiver) and the resident involved in the interaction.

In the illustrated example, the check-in sensor 315, and/or resident device 325 can be communicatively coupled to one or more remote systems, such as an EHR server 305, via a network 320. In the illustrated embodiment, the user device 310 does not have such capability. For example, the user device 310 may be capable of short-range communications (e.g., using RFID and/or NFC), but not equipped for communication over a broader network. In some embodiments, the EHR server 305 performs the user validation or authentication based on the indicated data. In some embodiments, the EHR server 305 corresponds to the EHR server 105 of FIG. 1 and/or the EHR server 205 of FIG. 2.

The network 320 can generally include one or more communications networks, and may include wired networks, wireless networks, or a combination of wired and wireless networks. In at least one embodiment, the network 320 can include the Internet. Although the illustrated example depicts the check-in sensor 315 and resident device 325 being communicatively coupled with the EHR server 305, in some embodiments, some or all of the devices may lack such capability.

In the illustrated example, the user device 310 can interact with a terminal 330, which is communicatively coupled with the EHR server 305. In embodiments, the operations of the terminal 330 may be implemented using hardware, software, or a combination of hardware and software. The terminal 330 can generally reside in any suitable location where it can be accessed by users and communicably linked with the EHR server 305. For example, in one embodiment, the terminal 330 is a computing device mounted to the wall in a hallway of a residential facility, located at a nursing station or other employee area, and the like. In some embodiments, the terminal 330 is a shared device used by multiple users.

In the depicted environment 300, after the user device 310 identifies the check-in sensor 315 and/or resident device 325 (or after the resident device 325 and/or check-in sensor 315 identify the user device 310), the user device 310 can be used in conjunction with the terminal 330 to retrieve and/or operate on the resident data. For example, the user device 310 may remember the most-recently identified check-in sensor 315 and/or resident device 315, and report these identities to the terminal 330. The terminal 330 may then either validate the user, as discussed above, or transmit the information to the EHR server 305 for validation. In some embodiments, the terminal 330 may simply identify the user device 310, and report its identity to the EHR server 305. The EHR server 305 may then determine the corresponding resident with which the user was interacting most recently, such as via the resident device 325 reporting that the user device 310 was detected.

In at least one embodiment, each of the devices can report the information, allowing the EHR server 305 to verify the data. For example, the terminal 330 may report the identity of the check-in sensor 315 and/or resident device 325 that was detected by the user device 310, and the check-in sensor 315 and/or resident device 325 may report the identity of the detected user device 310. This can allow the EHR server 305 to match the identifications and confirm, validate, or authenticate the check-in scan (e.g., confirming that the user device 310 is in the indicated location with the corresponding check-in sensor 315), as well as to match the identifications and confirm, validate, or authenticate that the user device 310 was in the indicated location with the corresponding resident device 325.

The EHR server 305 is generally configured to maintain information, such as electronic health records (EHR), related to one or more individuals (referred to in some aspects as residents or patients). For example, the EHR server 305 may maintain a respective resident profile for each resident in a residential facility. In embodiments, the operations of the EHR server 305 may be implemented using hardware, software, or a combination of hardware and software. The EHR server 305 can generally reside in any suitable location where it can be communicably linked with the terminal 330, check-in sensor 315, and/or resident device 325. For example, the EHR server 305 may be located on-premises at the residential facility, at a centralized location (which may serve multiple facilities), in the cloud, and the like.

In an embodiment, once the user has been authenticated (e.g., using the check-in scan reported by the terminal 330 and/or check-in sensor 315), the EHR server 305 can retrieve and return the relevant resident data based on the resident device 325. For example, if the resident device 325 is associated with a given physical location (e.g., because it is located in the resident's room), the EHR server 305 can retrieve and evaluate a mapping of physical spaces and resident devices and residents, thereby determining which physical space corresponds to the indicated resident device 325, and which resident resides in the determined space.

As another example, if the resident device 325 is associated with a specific resident (e.g., because it is worn or carried by the resident), the EHR server 305 can retrieve and evaluate a mapping of resident devices and residents, thereby determining which resident corresponds to the indicated resident device 325.

In some embodiments, as discussed above, the validation performed by the EHR server 305 can further include confirming that the user (associated with the user device 310) is authorized to interact with, view information for, modify the profile of, or otherwise access the resident and/or resident data. For example, the EHR server 305 (or another device) may evaluate staffing records or other information to confirm whether the user is an authorized user that serves the identified resident.

In some embodiments, this validation, data retrieval, and output can be performed automatically and without manual effort or input from the user. That is, the user need not manually identify or authenticate themselves (e.g., by providing credentials), and need not select or otherwise indicate the specific resident. This can significantly reduce errors or mistakes, as well as reduce the time required to identify and retrieve the relevant data. As discussed above, this significantly improves resident outcomes, as reduced errors generally result in improved care. Further, the workload on the system can be reduced. For example, conventional systems may require the user to manually authenticate themselves each time they enter a resident's room, which requires repeated communications over the network 320. Using aspects of the present disclosure, however, the need for this communication is reduced, thereby improving the operations and capacity of the system and network. Similarly, conventional systems require the user to manually identify the appropriate resident, which is tedious and error-prone. Using aspects of the present disclosure, the resident is automatically identified, resulting in reduced error and improved care to the resident.

In some embodiments, the system can additionally receive and automatically curate input from users (e.g., via the user device 310). For example, in one embodiment, once the resident profile has been output to the user, the user may indicate updates such as current vitals, progress notes, actions taken, and the like. The EHR server 305 may then automatically store these updates in the relevant portion(s) of the resident profile without requiring further manual effort. For example, the EHR server 305 may determine the current context (e.g., recent actions and events), and store updates accordingly. As one example, if the EHR server 305 determines that the resident recently underwent surgery and the received data is a progress note, the EHR server 305 may automatically input the note in the portion of the resident profile that relates to the surgery (or may prompt the user to confirm that the input should be associated with the surgery information).

Example Workflow for User Device-Based Data Services

Figure 4:
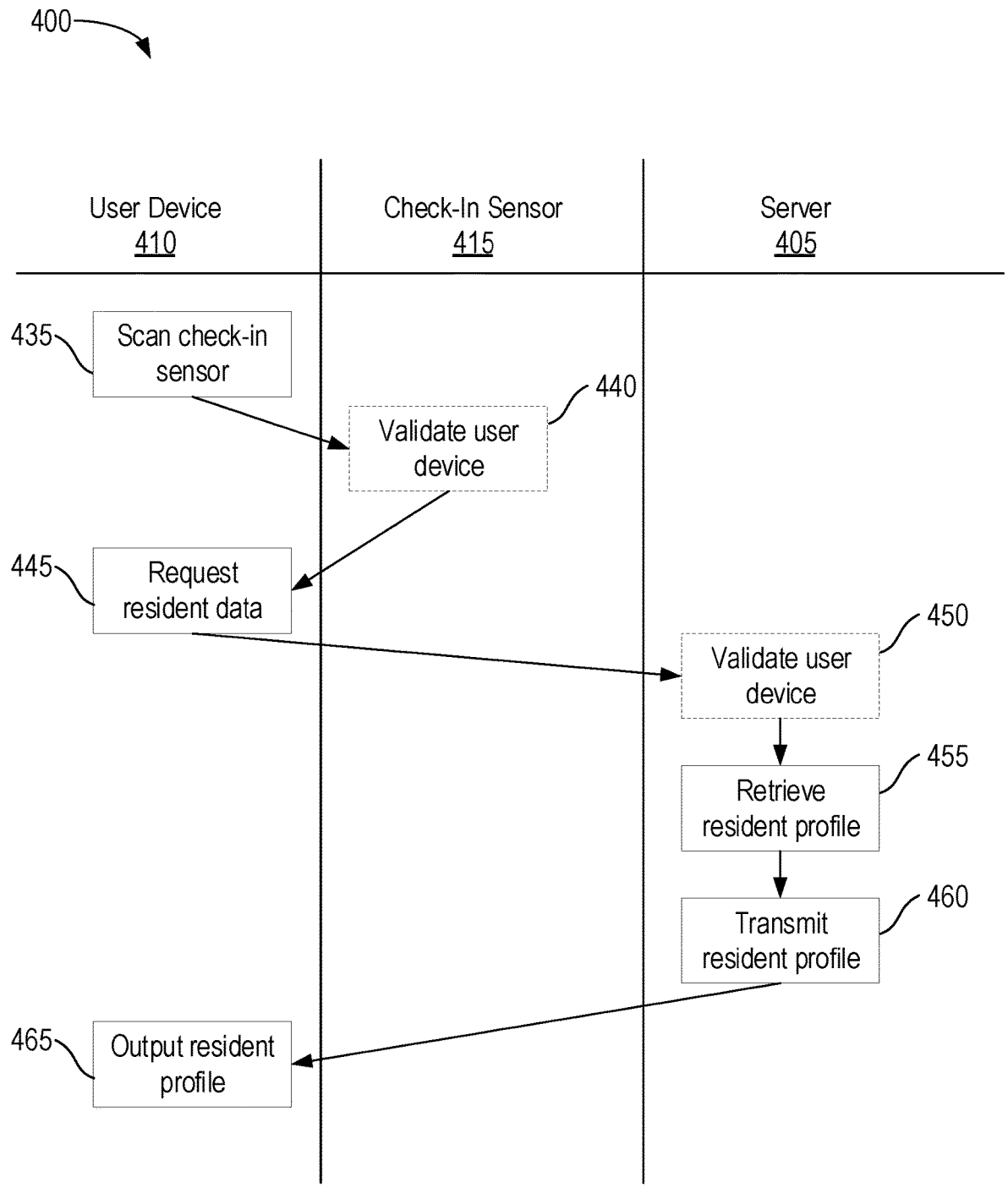
FIG. 4 depicts an example workflow for providing context-based data retrieval for a user device.

FIG. 4 depicts an example workflow 400 for providing context-based data retrieval for a user device. In the illustrated example, the workflow 400 involves a user device 410 (which may correspond to the user device 110 of FIG. 1, the user device 210 of FIG. 2, and/or the user device 310 of FIG. 3), a check-in sensor 415 (which may correspond to the check-in sensor 115 of FIG. 1, the check-in sensor 215 of FIG. 2, and/or the check-in sensor 315 of FIG. 3), and a server 405 (which may correspond to the EHR server 105 of FIG. 1, the EHR server 205 of FIG. 2, and/or the EHR server 305 of FIG. 3). In some embodiments, the workflow 400 is performed using a system such as depicted in the environment 100 of FIG. 1.

At block 435, the user device 410 scans the check-in sensor 415. Although the illustrated example depicts the user device 410 scanning the check-in sensor 415, in some embodiments, the check-in sensor 415 may scan the user device 410, as discussed above. In an embodiment, this operation may generally be referred to as a check-in scan or detection. In some embodiments, as discussed above, performing the check-in scan includes the user placing the user device 410 within a defined proximity of the check-in sensor 415 (e.g., near enough that the devices can identify or detect each other). For example, the user may tap the user device 410 to the check-in sensor 415, tap the check-in sensor 415 to the user device 410, walk, stand, or pass in proximity to the check-in sensor 415, and the like.

At block 440, the check-in sensor 440 can optionally validate the user device. For example, as discussed above, the check-in sensor 440 may determine whether the user device 410 (or the associated user) is authorized to receive, review, modify, or otherwise interact with resident data. In some embodiments, the check-in sensor 440 does so by transmitting the identity of the user device 410 (or the user) to the server 405. Additionally, in some embodiments, as discussed above, the check-in sensor 415 does not (or is not capable of) perform such validation.

At block 445, the user device 410 requests resident data from the server 405. In some embodiments, as discussed above, the user device 410 can be device such as a smartphone or tablet used by a caregiver. In the illustrated example, the user device 410 may request the resident data corresponding to the resident that the user is interacting with. For example, as discussed above, the user device 410 may request information relating to the resident associated with the identified check-in sensor 415. In other embodiments, if the check-in sensor 415 is associated with the user, the check-in scan may be used to identify the user (e.g., to log in to the system) automatically, allowing the user device 410 to request any resident data.

At block 450, the server 405 can optionally validate the user device 410. For example, as discussed above, the server 405 may determine the identity of the user associated with the user device 410 (or check-in sensor 415), and determine whether the indicated user has access permission to view and/or modify the indicated resident data.

If validation is successful (or is not performed), at block 455, the server 405 retrieves the resident profile of the indicated resident. As discussed above, the resident profile may generally include any relevant information for the resident, such as one or more EHRs, diagnoses, current status, biographical data, demographics data, and the like. In some embodiments, the resident profiles are updated (e.g., automatically or by users) to reflect any changes in condition or state, such as when a resident leaves a facility (e.g., to have in-patient surgery) or when a user performs some action (e.g., changing bandages) for the resident.

At block 460, the server 405 transmits the retrieved resident profile to the requesting user device 410. At block 465, the user device 410 can then output the profile (e.g., via a graphical user interface (GUI)). In this way, the system can automatically validate the request, identify the relevant data, and output it for the user seamlessly and without manual effort. This increases the accuracy of the system and reduces error, as well as allowing for improved outcomes for the residents.

Though not included in the illustrated example, in some embodiments, the user can also use the user device 410 to update the resident profile. For example, the user may interact with the user device using any suitable input technique (including a physical or virtual keyboard, a mouse, a touch-screen, speech recognition, and the like) to provide updates such as the current state of the resident, progress notes, actions that were performed or are being performed, and the like. As the system has already performed the automatic validation and data retrieval, in some embodiments, these updates may be automatically and seamlessly applied to the correct resident profile (e.g., without requiring the user to specifically identify the resident).

Example Workflow for Resident Device Based Data Services

Figure 5:
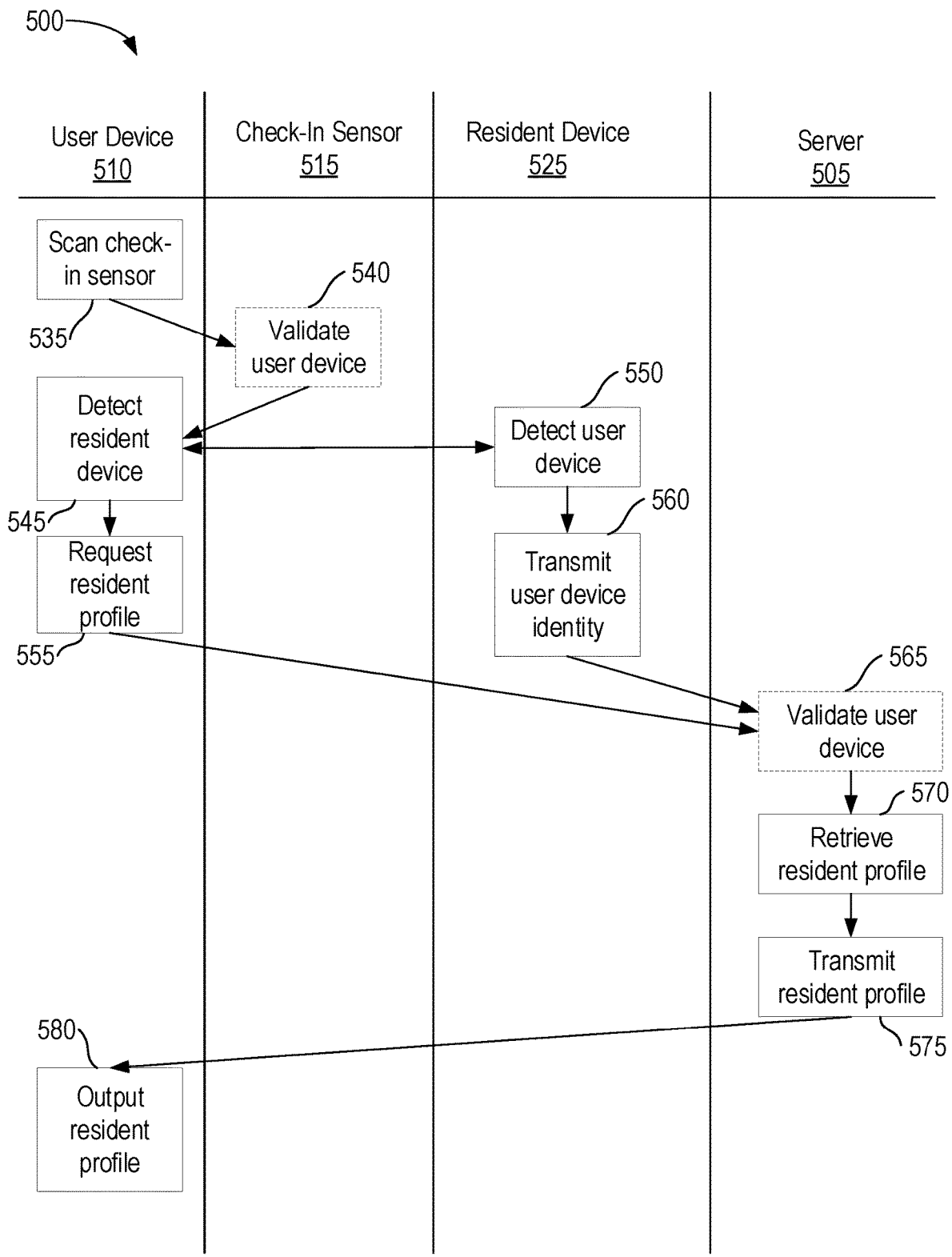
FIG. 5 depicts an example workflow for providing context-based data retrieval using a resident device.

FIG. 5 depicts an example workflow 500 for providing context-based data retrieval using a resident device. In the illustrated example, the workflow 500 involves a user device 510 (which may correspond to the user device 110 of FIG. 1, the user device 210 of FIG. 2, the user device 310 of FIG. 3, and/or the user device 410 of FIG. 4), a check-in sensor 515 (which may correspond to the check-in sensor 115 of FIG. 1, the check-in sensor 215 of FIG. 2, the check-in sensor 315 of FIG. 3, and/or the check-in sensor 415 of FIG. 4), a resident device 525 (which may correspond to the resident device 125 of FIG. 1, the resident device 225 of FIG. 2, and/or the resident device 325 of FIG. 3), and a server 505 (which may correspond to the EHR server 105 of FIG. 1, the EHR server 205 of FIG. 2, the EHR server 305 of FIG. 3, and/or the EHR server 405 of FIG. 4). In some embodiments, the workflow 500 is performed using a system such as depicted in the environment 200 of FIG. 2.

At block 535, the user device 510 scans the check-in sensor 515. Although the illustrated example depicts the user device 510 scanning the check-in sensor 515, in some embodiments, the check-in sensor 515 may scan the user device 510, as discussed above. In an embodiment, this operation may generally be referred to as a check-in scan or detection. In some embodiments, as discussed above, performing the check-in scan includes the user placing the user device 510 within a defined proximity of the check-in sensor 515 (e.g., near enough that the devices can identify or detect each other). For example, the user may tap the user device 510 to the check-in sensor 515, tap the check-in sensor 515 to the user device 510, walk, stand, or pass in proximity to the check-in sensor 515, and the like.

At block 540, the check-in sensor 540 can optionally validate the user device. For example, as discussed above, the check-in sensor 540 may determine whether the user device 510 (or the associated user) is authorized to receive, review, modify, or otherwise interact with resident data. In some embodiments, the check-in sensor 540 does so by transmitting the identity of the user device 510 (or the user) to the server 505. Additionally, in some embodiments, as discussed above, the check-in sensor 515 does not (or is not capable of) perform such validation.

At block 545, the user device 510 additionally detects the resident device 525. Although depicted as occurring subsequently to the check-in scan, in some embodiments, the user device 510 may identify the resident device 525 prior to the check-in scan or in parallel with the check-in scan. Additionally, at block 550, the resident device 525 detects the user device 510. Although depicted as occurring subsequently to the check-in scan and the detection of the resident device 525 (by the user device 510), in some embodiments, the resident device 525 may identify the user device 510 prior to or in parallel with the above operations.

In some embodiments, this operation (in blocks 545 and 550) may generally be referred to as a resident or patient scan or detection. In some embodiments, as discussed above, performing the resident scan includes the user and/or resident placing the user device 510 within a defined proximity of the resident device 525 (e.g., near enough that the devices can identify or detect each other). For example, the user may tap the user device 510 to the resident device 525, tap the resident device 525 to the user device 510, walk, stand, or pass in proximity to the resident device 525, and the like.

At block 555, the user device 510 requests a resident profile from the server 505. In some embodiments, as discussed above, the user device 510 can be device such as a smartphone or tablet used by a caregiver. In the illustrated example, the user device 510 may request the resident data corresponding to the resident that the user is interacting with. For example, as discussed above, the user device 510 may request information relating to the resident associated with the identified check-in sensor 515 and/or resident device 525.

Additionally, at block 560, the resident device 525 transmits the identity of the detected user device 510 to the server 505. In some embodiments, as discussed above, this can allow the server 505 to validate the encounter (e.g., to confirm that the user device 510 is, in fact, in proximity to the resident device 525). Additionally, in some embodiments, as discussed above, the resident device 525 may not transmit the user device identity (or may not be capable of doing so), such as when the resident device 525 is a passive component that outputs its own identity (e.g., via RFID or NFC) without further capability.

At block 565, the server 505 can optionally validate the user device 510 based on the received data. For example, as discussed above, the server 505 may determine the identity of the user associated with the user device 510 (or check-in sensor 515), and determine whether the indicated user has access permission to view and/or modify the indicated resident data. In some embodiments, the server 505 can additionally or alternatively validate the request based on the information received from the resident device 525. For example, the server 505 may confirm that the user device 510 was also detected the resident device 525 (e.g., as indicated at block 560).

In some embodiments, the server 505 determines a reported time of detection by each device (e.g., a timestamp indicating when the user device 510 detected the resident device 525 and a timestamp indicating when the resident device 525 detected the use device 510). For example, if the timestamps differ by more than a threshold duration, the server 505 may fail to validate the interaction. Such validation can help improve accuracy of the system (e.g., ensuring that the reported detections are consistent and reliable), thereby reducing data errors.

In one such embodiment, if the system fails to validate the request (e.g., because the user lacks permissions, or because the resident device 525 did not indicate that the user device 510 was detected), the server 505 can refrain from further action on the request. In at least one embodiment, the server 505 can return an error or other indication as to why the request for resident data is being denied.

If validation is successful (or is not performed), at block 570, the server 505 retrieves the resident profile of the indicated resident. In one embodiment, to do so, the server 505 may retrieve a mapping of resident devices 525 to residents. For example, if the resident device 525 is a wearable or mobile device such as a smart watch or smartphone, the mapping may indicate which resident uses, wears, carries, or is otherwise associated with the device. In some embodiments, the server 505 can additionally or alternatively retrieve a mapping of physical spaces to residents. For example, if the resident device 525 is embedded or attached to a resident bed (or is otherwise associated with a defined space), the server 505 may use the mapping to identify which resident(s) are assigned to or otherwise associated with the space.

As discussed above, the resident profile may generally include any relevant information for the resident, such as one or more EHRs, diagnoses, current status, biographical data, demographics data, and the like. In some embodiments, the resident profiles are updated (e.g., automatically or by users) to reflect any changes in condition or state, such as when a resident leaves a facility (e.g., to have in-patient surgery) or when a user performs some action (e.g., changing bandages) for the resident.

At block 575, the server 505 transmits the retrieved resident profile to the requesting user device 510. At block 580, the user device 510 can then output the profile (e.g., via a graphical user interface (GUI)). In this way, the system can automatically validate the request, identify the relevant data, and output it for the user seamlessly and without manual effort. This increases the accuracy of the system and reduces error, as well as allowing for improved outcomes for the residents.

Though not included in the illustrated example, in some embodiments, the user can also use the user device 510 to update the resident profile. For example, the user may interact with the user device using any suitable input technique (including a physical or virtual keyboard, a mouse, a touch-screen, speech recognition, and the like) to provide updates such as the current state of the resident, progress notes, actions that were performed or are being performed, and the like. As the system has already performed the automatic validation and data retrieval, in some embodiments, these updates may be automatically and seamlessly applied to the correct resident profile (e.g., without requiring the user to specifically identify the resident).

Example Workflow for Terminal-Based Data Services

Figure 6:
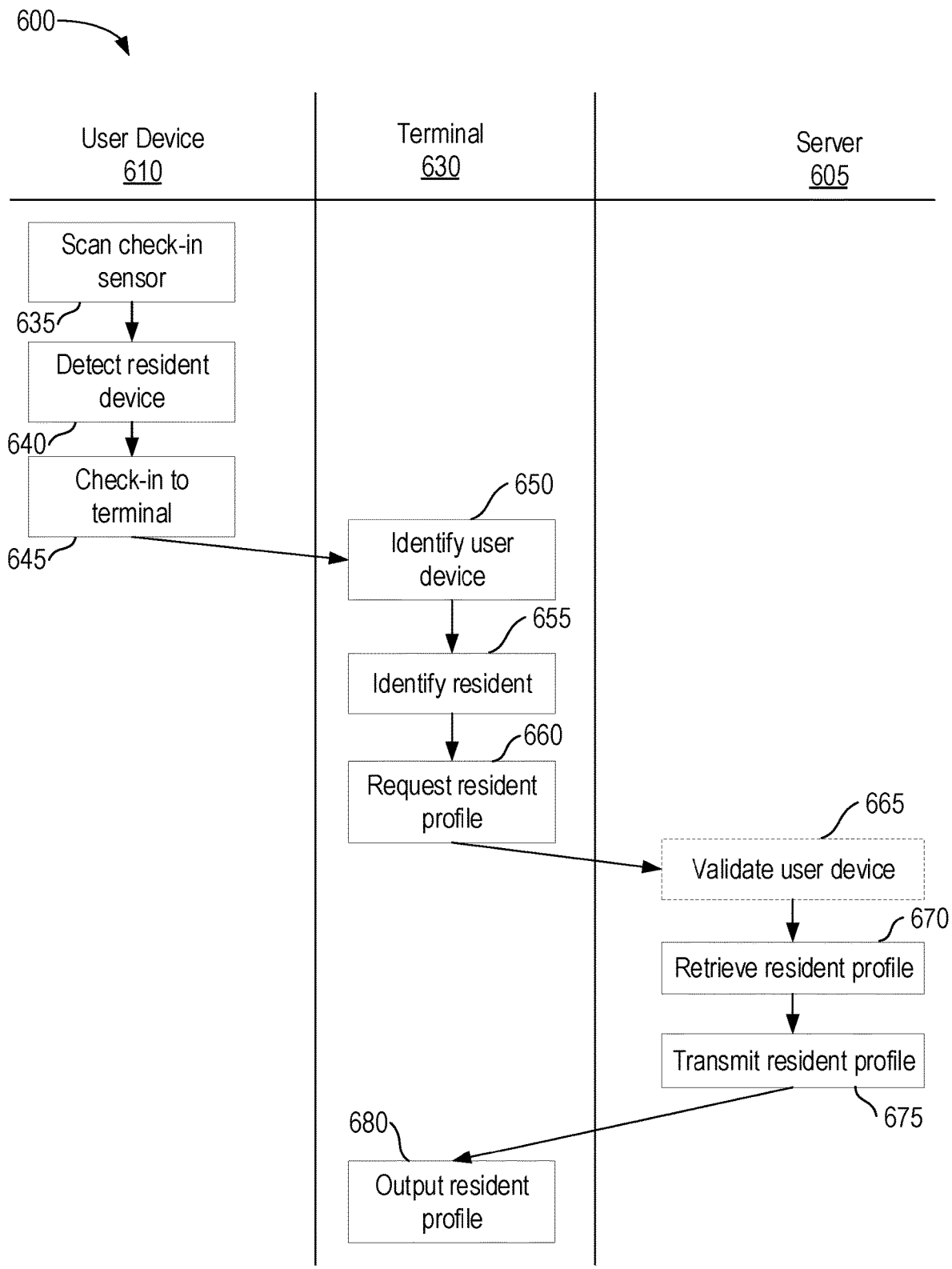
FIG. 6 depicts an example workflow for providing context-based data retrieval to a terminal device.

FIG. 6 depicts an example workflow 600 for providing context-based data retrieval to a terminal device. In the illustrated example, the workflow 600 involves a user device 610 (which may correspond to the user device 110 of FIG. 1, the user device 210 of FIG. 2, the user device 310 of FIG. 3, the user device 410 of FIG. 4, and/or the user device 510 of FIG. 5), a terminal 630 (which may correspond to the terminal 330 of FIG. 3), and a server 605 (which may correspond to the EHR server 105 of FIG. 1, the EHR server 205 of FIG. 2, the EHR server 305 of FIG. 3, the server 405 of FIG. 4, and/or the server 505 of FIG. 5).

Additionally, though not included in the illustrated example for conceptual clarity, in some embodiments, the workflow 600 may include other devices such as a check-in sensor (such as the check-in sensor 115 of FIG. 1, the check-in sensor 215 of FIG. 2, the check-in sensor 315 of FIG. 3, the check-in sensor 415 of FIG. 4, and/or the check-in sensor 515 of FIG. 5) and/or a resident device (such as the resident device 125 of FIG. 1, the resident device 225 of FIG. 2, the resident device 325 of FIG. 3, the resident device 425 of FIG. 4, and/or the resident device 525 of FIG. 5). In some embodiments, the workflow 600 is performed using a system such as depicted in the environment 300 of FIG. 3.

At block 635, the user device 610 scans a check-in sensor. Although the illustrated example depicts the user device 610 scanning the check-in sensor, in some embodiments, the check-in sensor may scan the user device 610, as discussed above. In an embodiment, this operation may generally be referred to as a check-in scan or detection. In some embodiments, as discussed above, performing the check-in scan includes the user placing the user device 610 within a defined proximity of the check-in sensor (e.g., near enough that the devices can identify or detect each other). For example, the user may tap the user device 610 to the check-in sensor, tap the check-in sensor to the user device 610, walk, stand, or pass in proximity to the check-in sensor, and the like.

At block 640, the user device 610 additionally detects a resident device. Although depicted as occurring subsequently to the check-in scan, in some embodiments, the user device 610 may identify the resident device prior to the check-in scan or in parallel with the check-in scan. In some embodiments, this operation (in block 640) may generally be referred to as a resident or patient scan or detection. In some embodiments, as discussed above, performing the resident scan includes the user and/or resident placing the user device 610 within a defined proximity of the resident device (e.g., near enough that the devices can identify or detect each other). For example, the user may tap the user device 610 to the resident device, tap the resident device to the user device 610, walk, stand, or pass in proximity to the resident device, and the like.

At block 645, the user device is used to check in to a terminal 630. For example, as discussed above, after tapping the user device 610 to the check-in sensor and/or resident device, the user may then proceed to the terminal 630 and tap or insert the user device 610 to the terminal 630. In some embodiments, this check-in includes transmitting or otherwise providing the data captured above, such as check-in data from block 635 and/or resident device data from block 640. As one example, a user device 610 (such as a caregiver's smartwatch) may be used to perform the check-in scan and to detect the resident device while the user is interacting with the resident (e.g., to provide assistance, such as helping with a meal). After finishing the assistance, the caregiver may proceed to the terminal 630 (e.g., at the nurse's station) and tap the user device 610 to the terminal 630 to perform the terminal check-in.

At block 650, the terminal 630 can identify the user device 610 and/or user based on this check-in. For example, the terminal 630 may identify the user indicated in the transmission, or may evaluate a mapping indicating which user is assigned to or associated with the detected user device 610. In some embodiments, the terminal 630 instead forwards an indication of the user device 610 to the server 605 to be evaluated.

At block 655, the terminal 630 can similarly identify the resident device and/or resident based on this check-in. For example, the terminal 630 may identify the resident indicated in the transmission, or may evaluate a mapping indicating which resident is assigned to or associated with the detected resident device. In some embodiments, the terminal 630 instead forwards an indication of the detected resident device to the server 605 to be evaluated.

Although not included in the illustrated example, in some embodiments, the terminal 630 can optionally validate the user as discussed above. This may include, for example, confirming that the user has access permissions for the indicated resident, confirming that the resident device and/or check-in sensor also reported identifying or detecting the user device, and the like.

At block 660, the terminal 630 requests a resident profile from the server 605. In some embodiments, as discussed above, the terminal 630 may request the resident data corresponding to the resident that the user was interacting with (e.g., as indicated in the check-in). For example, as discussed above, the terminal 630 may request information relating to the resident associated with the identified check-in sensor and/or resident device.

Although not included in the illustrated example, in some embodiments, the resident device can also transmit the identity of the detected user device 610 to the server 605. In some embodiments, as discussed above, this can allow the server 605 to validate the encounter (e.g., to confirm that the user device 610 was, in fact, in proximity to the resident device).

At block 665, the server 605 can optionally validate the user device 610 based on the received data. For example, as discussed above, the server 605 may determine the identity of the user associated with the user device 610 (or check-in sensor), and determine whether the indicated user has access permission to view and/or modify the indicated resident data. In some embodiments, the server 605 can additionally or alternatively validate the request based on the information received from the resident device, as discussed above. For example, the server 605 may confirm that the user device 610 was also detected the resident device. This can help improve accuracy of the system (e.g., ensuring that the reported detections are consistent and reliable), thereby reducing data errors.

In some embodiments, the server 605 determines a reported time of detection by each device (e.g., a timestamp indicating when the user device 610 detected the resident device and a timestamp indicating when the resident device detected the use device 610). For example, if the timestamps differ by more than a threshold duration, the server 605 may fail to validate the interaction. Such validation can help improve accuracy of the system (e.g., ensuring that the reported detections are consistent and reliable), thereby reducing data errors.

In some embodiments, if the system fails to validate the request (e.g., because the user lacks permissions, or because the resident device did not indicate that the user device 610 was detected), the server 605 can refrain from further action on the request. In at least one embodiment, the server 605 can return an error or other indication as to why the request for resident data is being denied.

If validation is successful (or is not performed), at block 670, the server 605 retrieves the resident profile of the indicated resident. In one embodiment, to do so, the server 605 may retrieve a mapping of resident devices to residents. For example, if the resident device is a wearable or mobile device such as a smart watch or smartphone or is otherwise assigned to or associated with a specific resident, the mapping may indicate which resident uses, wears, carries, or is otherwise associated with the device. In some embodiments, the server 605 can additionally or alternatively retrieve a mapping of physical spaces to residents. For example, if the resident device is embedded or attached to a resident bed (or is otherwise associated with a defined space), the server 605 may use the mapping to identify which resident(s) are assigned to or otherwise associated with the space.

As discussed above, the resident profile may generally include any relevant information for the resident, such as one or more EHRs, diagnoses, current status, biographical data, demographics data, and the like. In some embodiments, the resident profiles are updated (e.g., automatically or by users) to reflect any changes in condition or state, such as when a resident leaves a facility (e.g., to have in-patient surgery) or when a user performs some action (e.g., changing bandages) for the resident.

At block 675, the server 605 transmits the retrieved resident profile to the requesting terminal 630. At block 680, the terminal 630 can then output the profile (e.g., via a graphical user interface (GUI)). In this way, the system can automatically validate the request, identify the relevant data, and output it for the user seamlessly and without manual effort. This increases the accuracy of the system and reduces error, as well as allowing for improved outcomes for the residents.

Though not included in the illustrated example, in some embodiments, the user can also use the terminal 630 to update the resident profile. For example, the user may interact with the user device using any suitable input technique (including a physical or virtual keyboard, a mouse, a touch-screen, speech recognition, and the like) to provide updates such as the current state of the resident, progress notes, actions that were performed or are being performed, and the like. As the system has already performed the automatic validation and data retrieval, in some embodiments, these updates may be automatically and seamlessly applied to the correct resident profile (e.g., without requiring the user to specifically identify the resident).

Example Method for Context-Based Data Services

Figure 7:
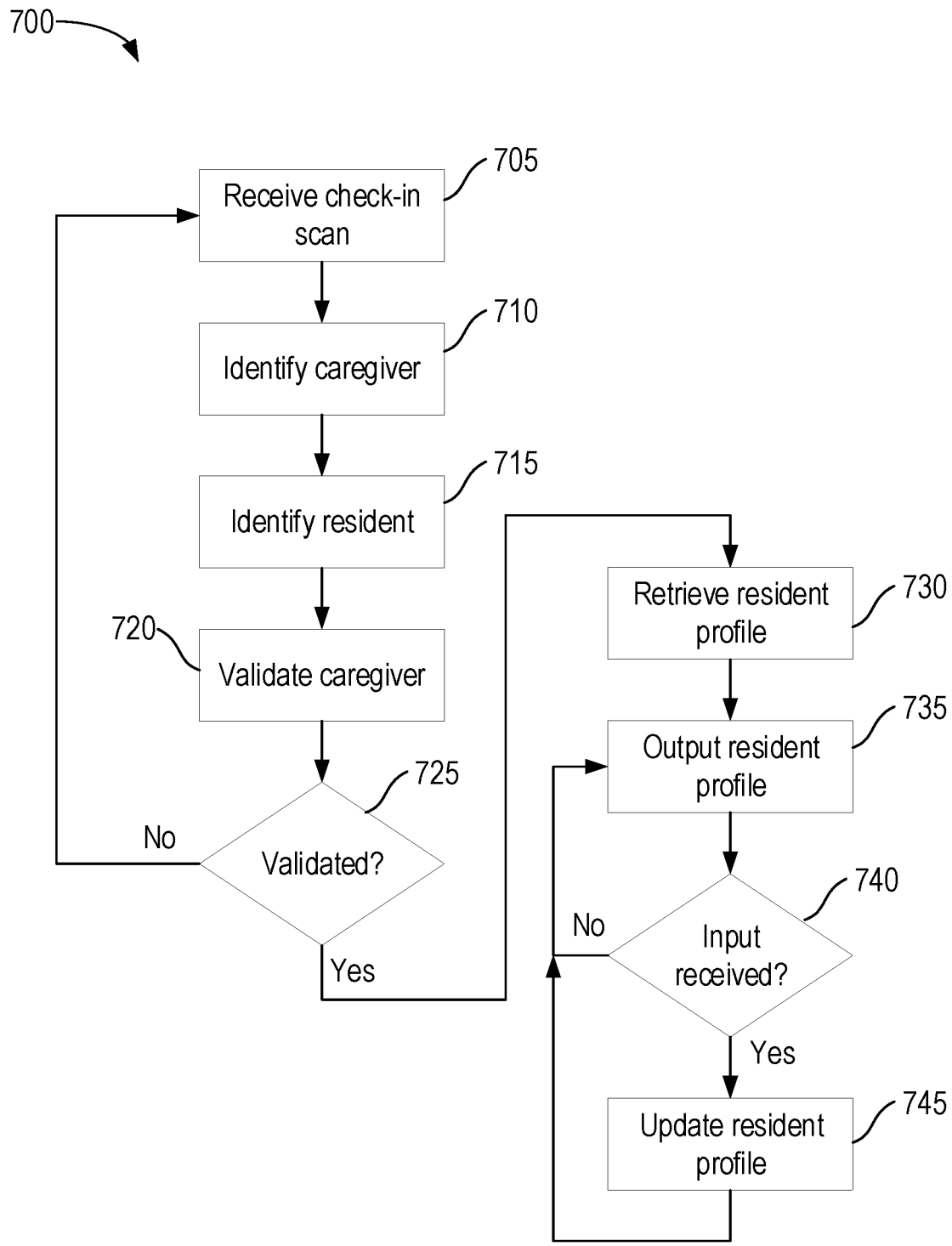
FIG. 7 is a flow diagram depicting an example method for providing dynamic and context-based data services.

FIG. 7 is a flow diagram depicting an example method 700 for providing dynamic and context-based data services. In some embodiments, the method 700 is performed jointly or separately by one or more devices, such as a user device (e.g., user device 110 of FIG. 1, user device 210 of FIG. 2, user device 310 of FIG. 3, user device 410 of FIG. 4, user device 510 of FIG. 5, and/or user device 610 of FIG. 6), a check-in sensor (e.g., check-in sensor 115 of FIG. 1, check-in sensor 215 of FIG. 2, check-in sensor 315 of FIG. 3, check-in sensor 415 of FIG. 4, and/or check-in sensor 515 of FIG. 5), a resident device (e.g., resident device 225 of FIG. 2, resident device 325 of FIG. 3, and/or resident device 525 of FIG. 5), a terminal (e.g., terminal 330 of FIG. 3 and/or terminal 630 of FIG. 6), and/or a server (e.g., EHR server 105 of FIG. 1, EHR server 205 of FIG. 2, EHR server 305 of FIG. 3, server 405 of FIG. 4, server 505 of FIG. 5, and/or server 605 of FIG. 6).

At block 705, a check-in scan is received. For example, as discussed above, a user device may scan a check-in sensor. In some embodiments, as discussed above, the check-in sensor may additionally or alternatively scan the user device. In at least one embodiment, this check-in scan can be used to authenticate the user (e.g., such that they do not need to manually enter credentials). In some embodiments, the check-in scan acts as an initiating action that triggers subsequent operations. For example, upon performing or receiving a check-in scan, the user device may begin searching for resident devices. In some embodiments, receiving the check-in scan is used to initiate subsequent evaluation and validation discussed below.

At block 710, the system identifies the caregiver associated with the check-in scan. For example, the system may identify the user associated with the user device that performed or participated in the scan. For example, a terminal or server may evaluate the check-in to determine the corresponding user device and/or user (if the user is explicitly indicated in the check-in data).

Similarly, at block 715, the system identifies the resident associated with the check-in scan. For example, the system may identify the resident associated with or assigned to a resident device that was detected in connection with the scan (e.g., shortly afterward), the resident associated with the check-in sensor that performed or participated in the scan, and the like. That is, a terminal or server may evaluate the check-in to determine the corresponding resident device and/or resident.

At block 720, the system can optionally validate the caregiver. For example, as discussed above, the system may confirm whether the caregiver is authorized to access the resident's data. In some embodiments, the validation includes confirming that the resident device detected the user device within a defined time from when the user device detected the resident device. In some embodiments, the validation can similarly include determining whether the resident device was detected within a defined time from when the check-in scan occurred (e.g., to ensure that the caregiver proceeded to interact with the resident shortly after the check-in, which may reduce or eliminate the possibility of error). At block 725, the system determines whether the validation was successful.

If the system is unable to validate or authenticate the caregiver, the method 700 returns to block 705 to receive a new check-in scan. If the validation is successful, the method 700 continues to block 730, where the system (e.g., an EHR server) retrieves the resident profile of the identified resident. In some embodiments, the system can automatically retrieve this profile, and refrain from requesting any further information (such as login credentials) from the user. That is, because the user was automatically validated or verified, the system can refrain from requesting or receiving further user credentials (and/or may ignore or discard them if they are received), as they are not needed. At block 735, the system can then output the retrieved profile. For example, the server may transmit the profile to a user device and/or terminal for display on a GUI. In some embodiments, as discussed in more detail below, the system may also identify relevant portion(s) of the profile based on the current context. For example, the system may return only recent portions (e.g., entries that were recently added or modified), or only return portions that are likely implicated or needed by the check-in scan (e.g., based on the time of day when the scan occurred, or the identity of the user). For example, based on the identified caregiver, the server may determine which record(s) are likely desired (e.g., inferring that a doctor that recently operated on the resident may need the surgical records, while a nurse that changed the resident's bandages recently may need other assistance or care records).

At block 740, the system determines whether user input has been received. That is, the system may determine whether the user has provided any input, update, or modification to the resident profile (e.g., using a user device or a terminal). For example, the user may use speech recognition, a keyboard, a mouse, a camera, and the like to provide relevant information, which may include progress notes, indications of actions that were taken or are needed, and the like. If not, the method 700 returns to block 735 to continue outputting the resident profile. If so, the method 700 continues to block 745

At block 745, the system (e.g., the EHR server) updates the resident profile based on the received input. In some embodiments, the server adds the received input to the profile (e.g., as a newest entry in the profile). In at least one embodiment, if a specific or most-relevant portion of the profile was returned at block 730 and 735, the system can update these specific portions. For example, if a surgical record was returned, the system may automatically update this record to indicate new progress notes or a new status. If records of prior assistance actions was retrieved, the system can generate a new record indicating the new assistance action. The method 700 then returns to block 735 to continue outputting the profile.

Advantageously, the method 700 allows the system to seamlessly and accurately validate requests and retrieve relevant data without requiring any manual effort or specification by the user. This automated system of data service can enable more accurate computing results, reduced computational burden and latency, and improved resident or patient results. For example, the user is able to review relevant information and update appropriate profiles automatically without needing to explicitly indicate the relevant data or resident. This can dramatically improve the operations of the system.

Example Method for Context-Based Data Output

Figure 8:
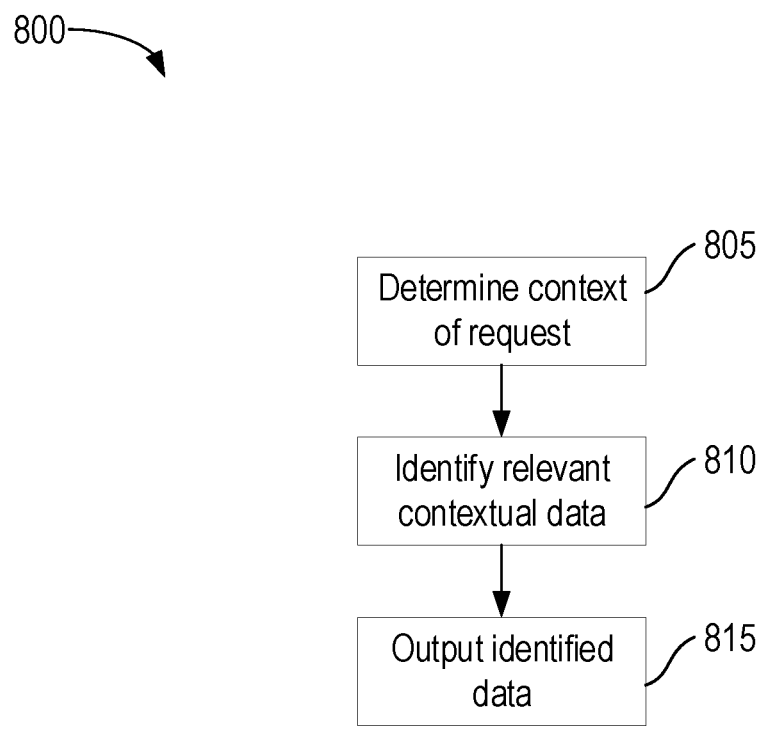
FIG. 8 is a flow diagram depicting an example method for identify and output data based on context.

FIG. 8 is a flow diagram depicting an example method 800 for identify and output data based on context. In some embodiments, the method 800 is performed by a server (e.g., EHR server 105 of FIG. 1, EHR server 205 of FIG. 2, EHR server 305 of FIG. 3, server 405 of FIG. 4, server 505 of FIG. 5, and/or server 605 of FIG. 6). In some embodiments, the method 800 provides additional detail for block 730 of FIG. 7.

At block 805, the server determines the current context of the request. For example, the server may evaluate the resident data to identify the most recent records or entries (e.g., indicating recent changes in status, recent events or actions, and the like). In some embodiments, the server may additionally or alternatively evaluate other context such as the identity of the requesting user or caregiver. For example, the server may determine whether the user previously interacted with the resident profile (e.g., adding new data or modifying existing data). If so, these recent records may be used as the context.

As another example, the context may include the role of the user (e.g., whether they are a new doctor, an attending or prior doctor, a nurse, and the like). In some aspects, the context can also include elements such as the timing of the request (e.g., whether it was received overnight or during daytime hours).

At block 810, the server identifies relevant data based on the determined context. In one embodiment, as discussed above, the relevant contextual data may correspond to the records that were most recently added and/or modified (e.g., within a defined window of time). For example, the server may automatically retrieve any records recorded or updated within a period of time (e.g., the last 24 hours), any records that were recorded or updated since the last time the specific caregiver (or any caregiver) retrieved the profile, and the like.

In some embodiments, the contextual data includes the records that were reviewed, edited, or added by the specific requesting user most recently. For example, the server may identify any data that the specific caregiver recently interacted with (e.g., within a defined time period) and provide this data as the most relevant contextual data.

As another example, the server may identify records relevant to the role of the current user. For example, if the caregiver typically performs a specific assessment (e.g., a mental health assessment), the server may retrieve the relevant mental health data. As yet another example, the server may identify data that is most likely to be relevant based on the time of the request. For example, requests during overnight hours may be generally associated with different data, as compared to daytime requests. In some embodiments, requests at a specific time may likely correspond to an action or event that occurs daily at that time. For example, the server may identify other data that was entered and/or modified at similar times (e.g., at the same or a similar time each day for the last week), and return these records as the appropriate contextual data.

At block 815, the server outputs the identified data. In an embodiment, this may include transmitting it to a user device and/or terminal for display to the user, as discussed above.

Advantageously, the method 800 allows the system to seamlessly and accurately retrieve the most relevant contextual data without requiring any manual effort or specification by the user. This automated system of data service can enable more accurate computing results, reduced computational burden and latency, and improved resident or patient results. For example, the user is able to review the most relevant information and update the most relevant portions of the profile automatically and immediately without needing to explicitly indicate the relevant data or resident. This can dramatically improve the operations of the system.

Example Method for Data Services Based on Physical Location

Figure 9:
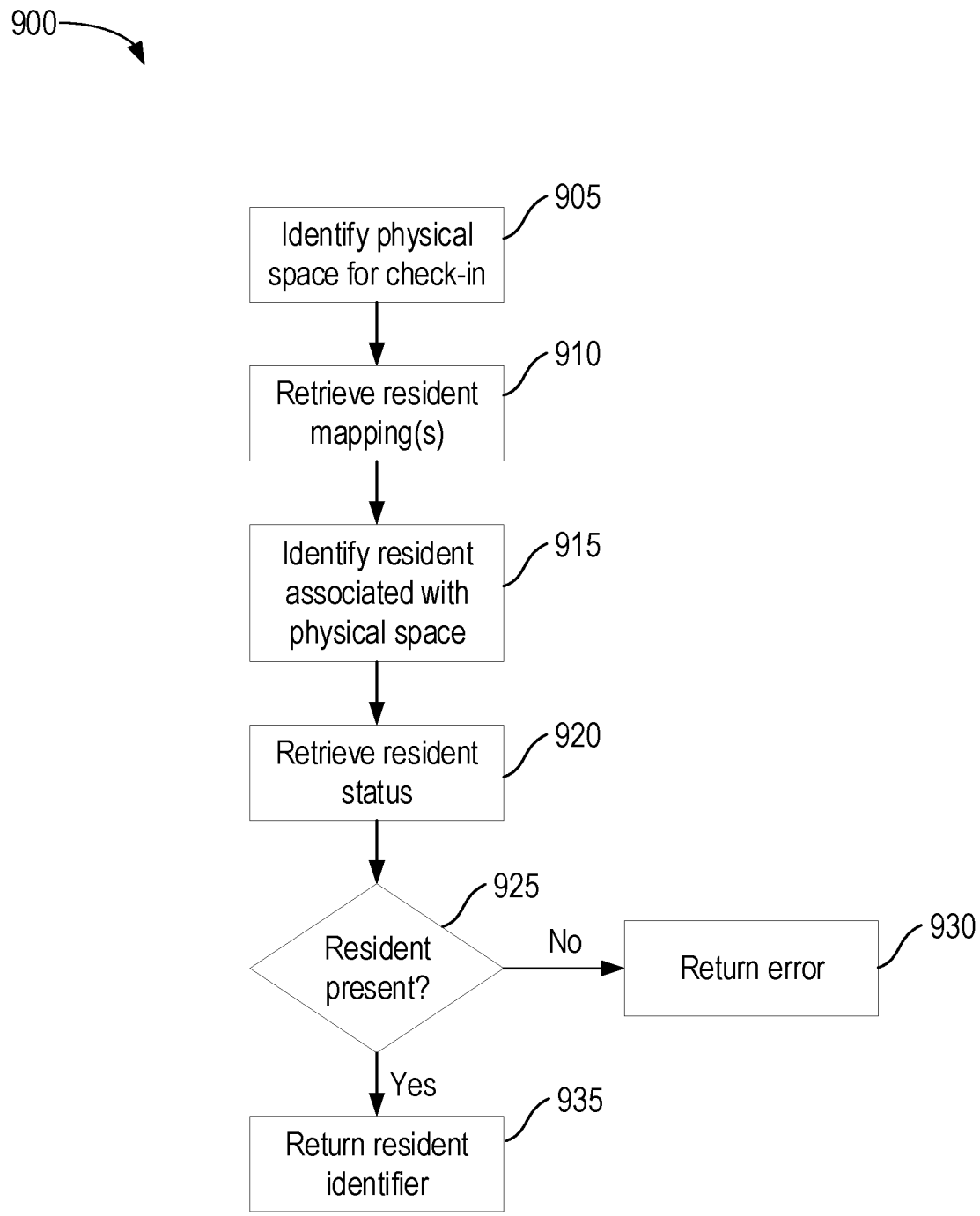
FIG. 9 is a flow diagram depicting an example method for providing context-based data services based on physical location.

FIG. 9 is a flow diagram depicting an example method 900 for providing context-based data services based on physical location. In some embodiments, the method 900 is performed by a server (e.g., EHR server 105 of FIG. 1, EHR server 205 of FIG. 2, EHR server 305 of FIG. 3, server 405 of FIG. 4, server 505 of FIG. 5, and/or server 605 of FIG. 6). In some embodiments, the method 900 provides additional detail for block 715 of FIG. 7.

At block 905, the server identifies the physical space or location associated with the check-in data. For example, if the check-in device is a sensor in a specific room, the server can identify this room. In some embodiments, the server identifies the physical space based on the resident device(s) detected by the user device (e.g., where the resident devices may be mapped or assigned to specific spaces). In at least one embodiment, to identify the physical space, the server can determine the positioning of the user device at the time of the check-in (e.g., using indoor or global positioning systems, cameras that can be used to recognize the user, and the like).

At block 910, the server retrieves a set of resident mappings that indicate the relationships between physical spaces and residents. For example, in the case of a residential care facility, the mapping may indicate which resident (or residents) are assigned to or otherwise residing in each room (e.g., each dormitory or other sleeping quarters). At block 915, the server identifies, based on the mappings, the resident(s) that is associated with or assigned to the identified physical space.

At block 920, the server can optionally retrieve the status of the identified resident. For example, in some embodiments, the resident profile can indicate whether the resident is currently residing in the facility, whether they are temporarily out of the facility (e.g., for an inpatient procedure in a hospital, for a vacation or other trip away from the facility, and the like), whether they have permanently left the facility (e.g., to move to a new facility), and the like.

At block 925, the server determines whether the resident is currently present in the facility (or otherwise whether the resident status indicates that the resident data is relevant, such that it is reasonable or expected that a caregiver will need to review or modify it). If so, the method 900 continues to block 935, where the server returns the resident identifier for subsequent processing (e.g., to identify the relevant contextual data). If, at block 925, the server determines that the resident is not present, the method 900 continues to block 930, where the server returns an error indicating that the resident data cannot be (or will not be) returned because the resident is absent (or it is otherwise not appropriate to review or modify the profile at this time).

Example Method for Data Services Based on Device Mappings

Figure 10:
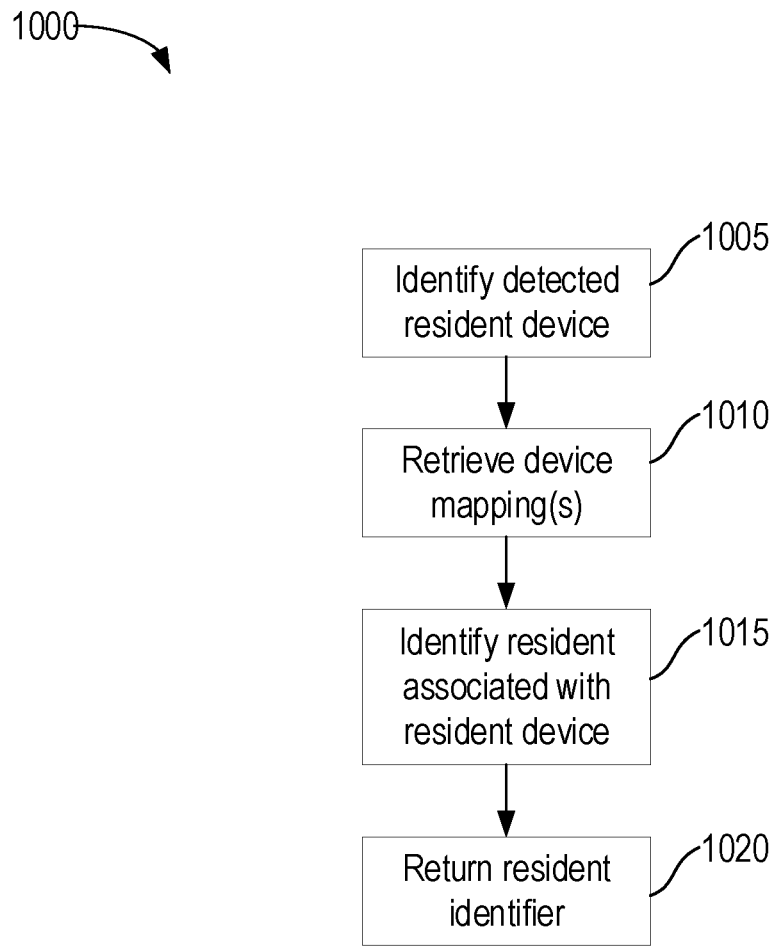
FIG. 10 is a flow diagram depicting an example method for providing context-based data services based on device mappings.

FIG. 10 is a flow diagram depicting an example method 1000 for providing context-based data services based on device mappings. In some embodiments, the method 1000 is performed by a server (e.g., EHR server 105 of FIG. 1, EHR server 205 of FIG. 2, EHR server 305 of FIG. 3, server 405 of FIG. 4, server 505 of FIG. 5, and/or server 605 of FIG. 6). In some embodiments, the method 1000 provides additional detail for block 715 of FIG. 7.

At block 1005, the server identifies the resident device that was detected by the user device in association with the check-in scan. For example, the server can determine a unique identifier of the resident device.

At block 1010, the server retrieves a set of device mappings that indicate the relationships between devices and residents. For example, in the case of a residential care facility, the mapping may indicate which resident (or residents) are assigned to or otherwise associated with each resident device. For example, the mapping may indicate which resident is assigned to the bed which the resident device is affixed to, or which resident wears or otherwise uses the resident device (in the case of wearables or mobile devise). At block 1015, the server identifies, based on the mappings, the resident(s) that is associated with or assigned to the identified resident device.

At block 1020, the server can return the determined identifier for the resident device for subsequent processing (e.g., to identify the relevant contextual data). Although not included in the illustrated example, in some embodiments, the server can additionally perform other validation prior to returning the resident identifier. For example, as discussed above with reference to FIG. 9, the server can optionally retrieve the status of the identified resident (e.g., indicating whether the resident is currently residing in the facility, whether they are temporarily out of the facility, whether they have permanently left the facility, and the like). In one such embodiment, the server can determine whether the resident is currently present in the facility (or otherwise whether the resident status indicates that the resident data is relevant, such that it is reasonable or expected that a caregiver will need to review or modify it) and determine whether to provide the identifier based on this analysis, as discussed above.

Example Method for User Device Data Services

Figure 11:
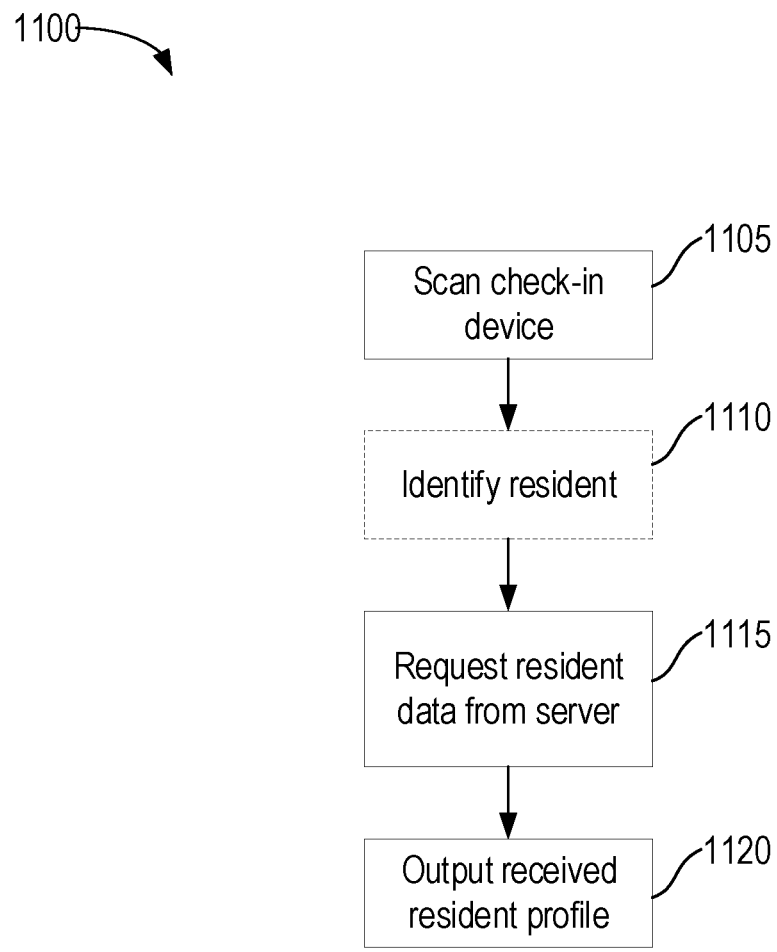
FIG. 11 is a flow diagram depicting an example method for providing context-based data services using a user device.

FIG. 11 is a flow diagram depicting an example method 1100 for providing context-based data services using a user device. In some embodiments, the method 1100 is performed by a user device (e.g., user device 110 of FIG. 1, user device 210 of FIG. 2, user device 310 of FIG. 3, user device 410 of FIG. 4, user device 510 of FIG. 5, and/or user device 610 of FIG. 6).

At block 1105, the user device scans a check-in device. For example, as discussed above, the user device may be a device held, carried, or worn by the user (e.g., a caregiver), such as a smartphone, a smart watch, a smart ring, a tablet, and the like. In some embodiments, the check-in device is a sensor or other component that is used to initiate the interaction (or initiate recording of the interaction, or otherwise mark the start of the interaction) and/or authenticate the user. In some embodiments, as discussed above, the check-in device may additionally or alternatively scan the user device.

At block 1110, the user device can optionally identify the resident involved in the interaction. In at least one embodiment, the user device does so based on the check-in scan (e.g., based on the resident associated with the check-in device). In some embodiments, the user device identifies the resident by detecting, scanning, or otherwise identifying a resident device, as discussed above. For example, the user device may detect or identify a device attached to or integrated in the room (e.g., on the wall, on the resident's bed, and the like). In some embodiments, the user device can identify the resident based on the detected resident device. For example, the resident device may transmit an indication of the corresponding resident. As another example, the resident device may transmit a unique identifier of the device (e.g., a MAC address) which can be used to look up the corresponding resident (e.g., by the user device or by a server). In some embodiments, as discussed above, the resident device may additionally or alternatively identify the user device and/or the corresponding caregiver.

At block 1115, the user device requests resident data from a server (such as the EHR server 105 of FIG. 1). For example, as discussed above, the user device may transmit a request for all or a portion of the resident profile for the specifically identified resident (or for the resident that corresponds to the detected resident device).

At block 1120, the user device outputs the received resident profile from the server. In some embodiments, as discussed above, this includes outputting all or a portion of the data via a GUI of the user device. In at least one embodiment, the user device can output a portion of the profile (e.g., the most contextually-relevant portions, as discussed above). In some embodiments, the user device itself identifies the most relevant portions of the profile. In other embodiments, the server can identify the relevant portion(s).

Example Method for Resident Device Data Services

Figure 12:
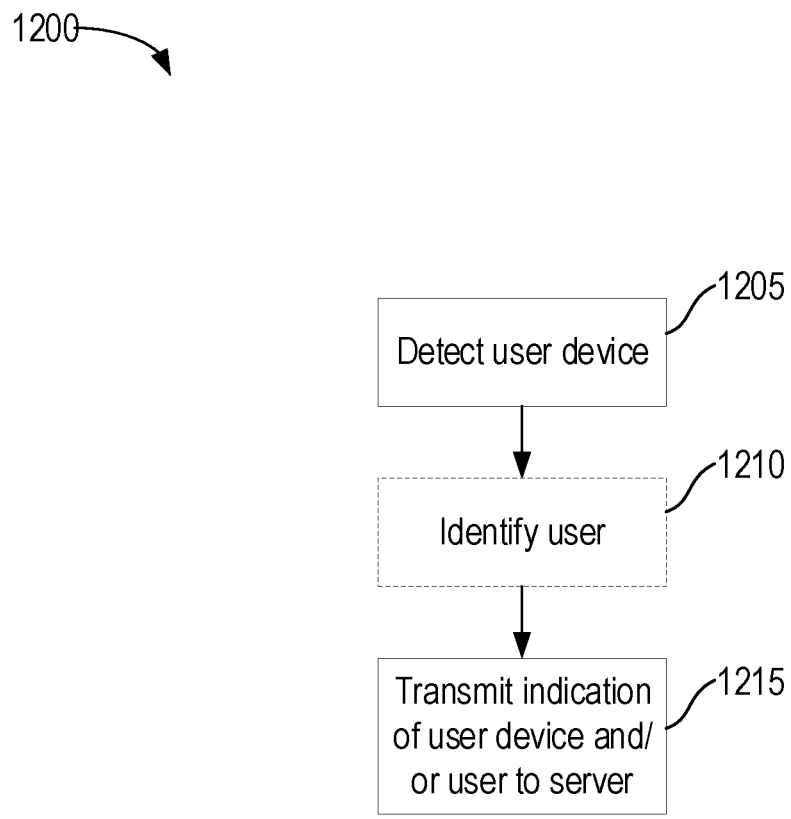
FIG. 12 is a flow diagram depicting an example method for providing context-based data services using a resident device.

FIG. 12 is a flow diagram depicting an example method 1200 for providing context-based data services using a resident device. In some embodiments, the method 1200 is performed by a resident device (e.g., resident device 225 of FIG. 2, resident device 325 of FIG. 3, and/or resident device 525 of FIG. 5).

At block 1205, the resident device detects a user device. For example, as discussed above, the resident device may use one or more wireless communication techniques such as RFID and/or NFC to detect the presence of user devices within a defined proximity (e.g., within a few feet, or within the range of short-range radio communications). In some embodiments, detecting the user device includes determining a unique identifier provided by the device (e.g., a MAC address).

At block 1210, the resident device can optionally identify the corresponding user or caregiver for the user device. For example, as discussed above, the resident device may refer to a mapping of user devices to caregivers to identify which caregiver is in proximity to the resident device. In some embodiments, rather than identifying the user specifically, the server can identify the user.

At block 1215, the resident device transmits an indication of the detected user device and/or identified user to a server (e.g., the EHR server). In some embodiments, the resident device also transmits a timestamp indicating when the user device was detected (e.g., when it was first detected, when the signal was strongest, when it was last detected, and the like).

As discussed above, the server may use this information to help authenticate or validate the user device and/or interaction. For example, the resident device may confirm that the user device also detected the resident device at the indicated time(s). This can improve the accuracy of the overall system.

Example Method for Terminal-Based Data Services

Figure 13:
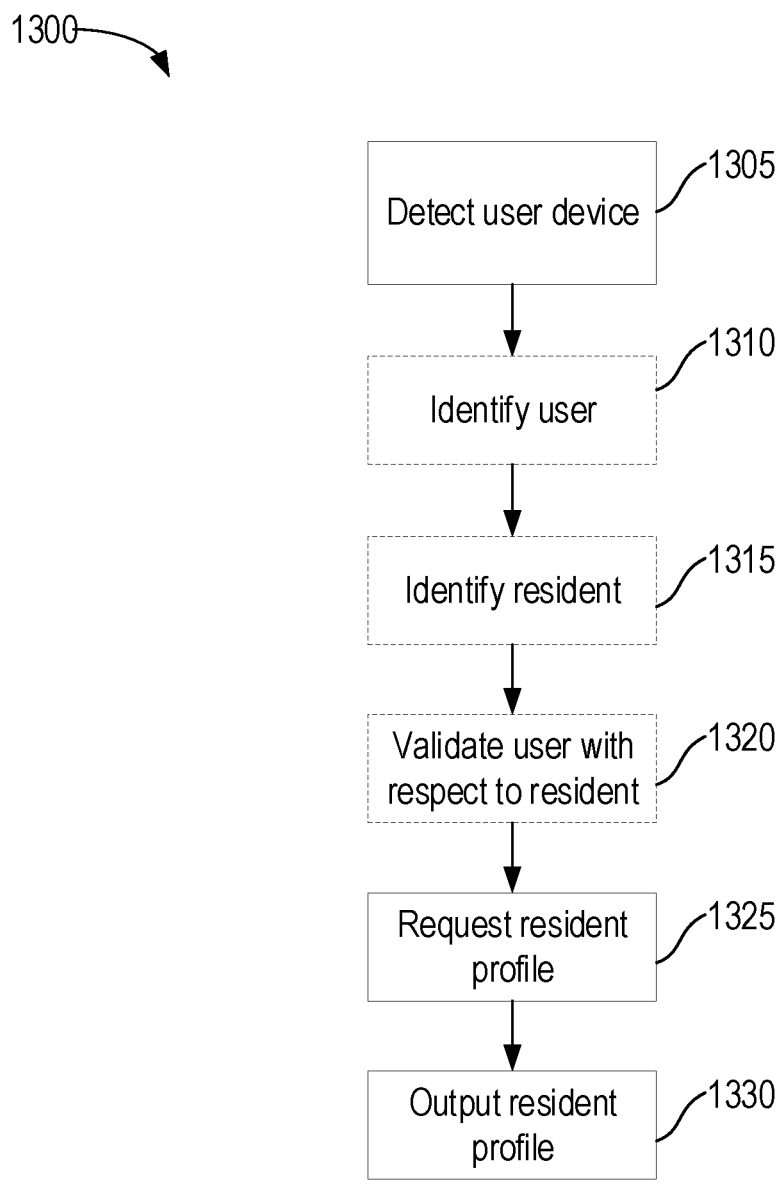
FIG. 13 is a flow diagram depicting an example method for providing context-based data services using a terminal device.

FIG. 13 is a flow diagram depicting an example method 1300 for providing context-based data services using a terminal device. In some embodiments, the method 1300 is performed by a terminal (e.g., terminal 330 of FIG. 3 and/or terminal 630 of FIG. 6).

At block 1305, the terminal detects a user device. For example, as discussed above, the user may scan, tap, or otherwise bring the user device into detection range of the terminal, allowing the terminal to identify the user device (e.g., to identify a unique identifier of the user device).

At block 1310, the terminal can optionally identify the user of the detected user device. For example, as discussed above, the terminal may look up the user device identifier in a mapping to identify the user (e.g., the caregiver) that is associated with the user device. In some embodiments, rather than identifying the user, the terminal can simply transmit the detected user device identifier to a server for identification.

At block 1315, the terminal optionally identifies the resident that is indicated by the user device. For example, as discussed above, the user device may detect the resident(s) involved in an interaction (e.g., detecting nearby resident devices). Subsequently, when the terminal detects the user device, the user may indicate not only its own identifier, but also the identifier of the relevant resident device(s) involved in the interaction. In some embodiments, at block 1315, the terminal can refer to one or more mappings specifying which resident is associated with the indicated resident device (or with the space associated with the resident device). In some embodiments, rather than specifically identifying the resident, the terminal can instead transmit the indicated resident device identifier to the server for identification.

At block 1320, the terminal optionally validates the identified user with respect to the identified resident. For example, as discussed above, the terminal may determine access privileges of the user to confirm that they are authorized to interact with, view, and/or modify the data of the identified resident. In some embodiments, as discussed above, the terminal can also confirm that the resident device also detected the user device at the indicated time(s).

At block 1325, if the validation was successful (or not performed), the terminal can request the profile of the identified resident (or, if the specific resident was not identified, request the profile of the resident which corresponds to the indicated resident device). For example, as discussed above, the terminal may transmit the request to a server (e.g., an EHR server) that maintains resident data (e.g., in resident profiles).

At block 1330, the terminal outputs the received resident profile (e.g., on a GUI). In some embodiments, as discussed above, this includes outputting all or a portion of the data via a GUI of the terminal. In at least one embodiment, the terminal can output a portion of the profile (e.g., the most contextually-relevant portions, as discussed above). In some embodiments, the terminal itself identifies the most relevant portions of the profile. In other embodiments, the server can identify the relevant portion(s).

Example Method for Server Data Services

Figure 14:
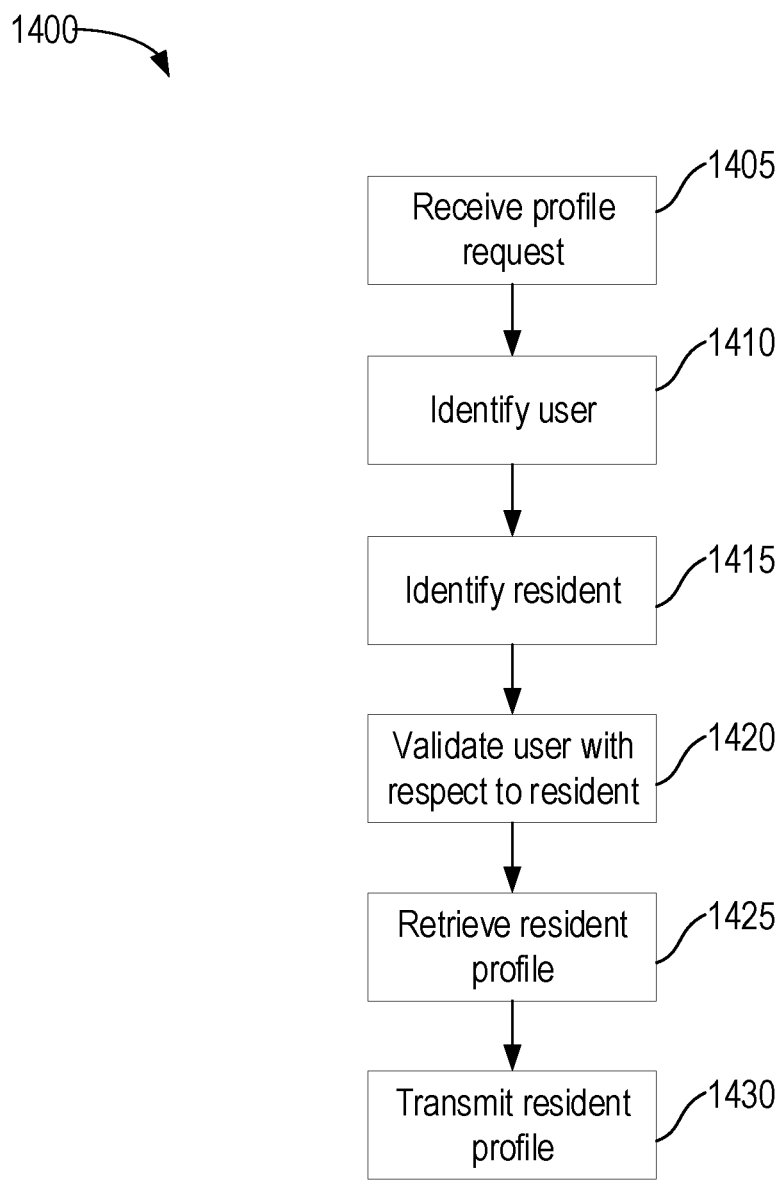
FIG. 14 is a flow diagram depicting an example method for providing context-based data services on a server.

FIG. 14 is a flow diagram depicting an example method 1400 for providing context-based data services on a server. In some embodiments, the method 1400 is performed by a server (e.g., EHR server 105 of FIG. 1, EHR server 205 of FIG. 2, EHR server 305 of FIG. 3, server 405 of FIG. 4, server 505 of FIG. 5, and/or server 605 of FIG. 6).

At block 1405, the server receives a request for a resident profile. In some embodiments, the request can be received from a user device (e.g., a caregiver's tablet). In some embodiments, the request is received from a terminal device (e.g., a shared computer at an employee station). In some embodiments, the profile request specifically identifies the resident (e.g., by name or other unique identifier). In at least one embodiment, the request indicates a check-in device and/or resident device, asking that the server identify the corresponding resident.

At block 1410, the server identifies the user associated with the request. For example, the server may identify the caregiver that interacted with the resident and/or transmitted the request for data. In some embodiments, as discussed above, the server may identify the user by retrieving one or more mappings (e.g., indicating which caregiver is associated with each user device), and looking up the user device that provided the request or is otherwise indicated in the request (e.g., if a terminal transmitted the request).

At block 1415, the server identifies the resident about whom data is requested. For example, as discussed above, the server may retrieve and evaluate one or more mappings to determine which resident is assigned to or associated with the indicated resident device, which resident is assigned to or associated with the physical space that is assigned to or associated with the resident device, and the like.

At block 1420, the server validates the user with respect to the resident. For example, as discussed above, the server may determine access privileges of the user to confirm that they are authorized to interact with, view, and/or modify the data of the identified resident. In some embodiments, as discussed above, the server can also confirm that the resident device also detected the user device at the indicated time(s). In some embodiments, as discussed above, the server can also confirm that the resident's status allows the data to be retrieved (e.g., indicating that the resident is currently present in the facility).

At block 1425, if the validation was successful, the server can retrieve the profile of the identified resident. For example, as discussed above, the server may retrieve, from (local or remote) storage, some or all of the data available for the requested resident. In at least some embodiments, as discussed above, the server can identify the contextually-relevant portions of the resident profile, such as the most recent records, the records that were authored or created by the requesting user, and the like.

At block 1430, the server transmits the resident profile (or a portion thereof) to the requesting device (e.g., to the user device or terminal). In an embodiment, as discussed above, the requesting device can then output the received resident profile (e.g., on a GUI).

Example Method for Context-Based Data Services

Figure 15:
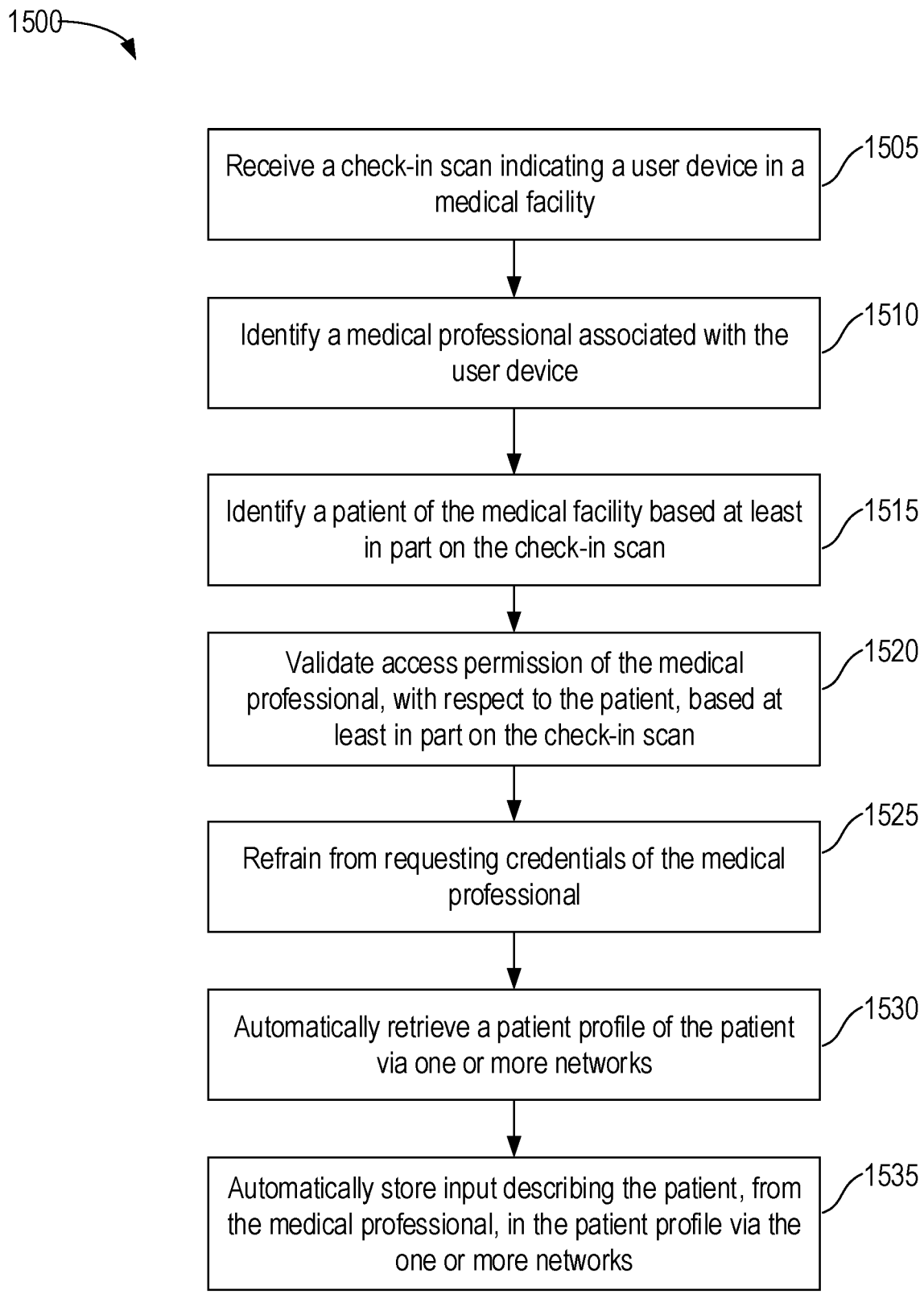
FIG. 15 is a flow diagram depicting an example method for providing context-based data services.

FIG. 15 is a flow diagram depicting an example method 1500 for providing context-based data services. In some embodiments, the method 1500 is performed by a server (e.g., EHR server 105 of FIG. 1, EHR server 205 of FIG. 2, EHR server 305 of FIG. 3, server 405 of FIG. 4, server 505 of FIG. 5, and/or server 605 of FIG. 6).

At block 1505, a check-in scan (e.g., via a check-in sensor or device such as the check-in sensor 115 of FIG. 1, check-in sensor 215 of FIG. 2, check-in sensor 315 of FIG. 3, check-in sensor 415 of FIG. 4, and/or check-in sensor 515 of FIG. 5) indicating a user device (e.g., the user device 110 of FIG. 1, user device 110 of FIG. 1, user device 210 of FIG. 2, user device 310 of FIG. 3, user device 410 of FIG. 4, user device 510 of FIG. 5, and/or user device 610 of FIG. 6) in a medical facility is received.

At block 1510, a medical professional (e.g., a user) associated with the user device is identified.

At block 1515, a patient of the medical facility is identified based at least in part on the check-in scan.

At block 1520, access permission of the medical professional is validated, with respect to the patient, based at least in part on the check-in scan.

At block 1525, in response to validating the access permission of the medical professional, the system refrains from requesting credentials of the medical professional.

At block 1530, a patient profile of the patient is automatically retrieved via one or more networks.

At block 1535, input describing the patient, from the medical professional, is automatically stored in the patient profile via the one or more networks.

Example User System for Improved Data Services

Figure 16:
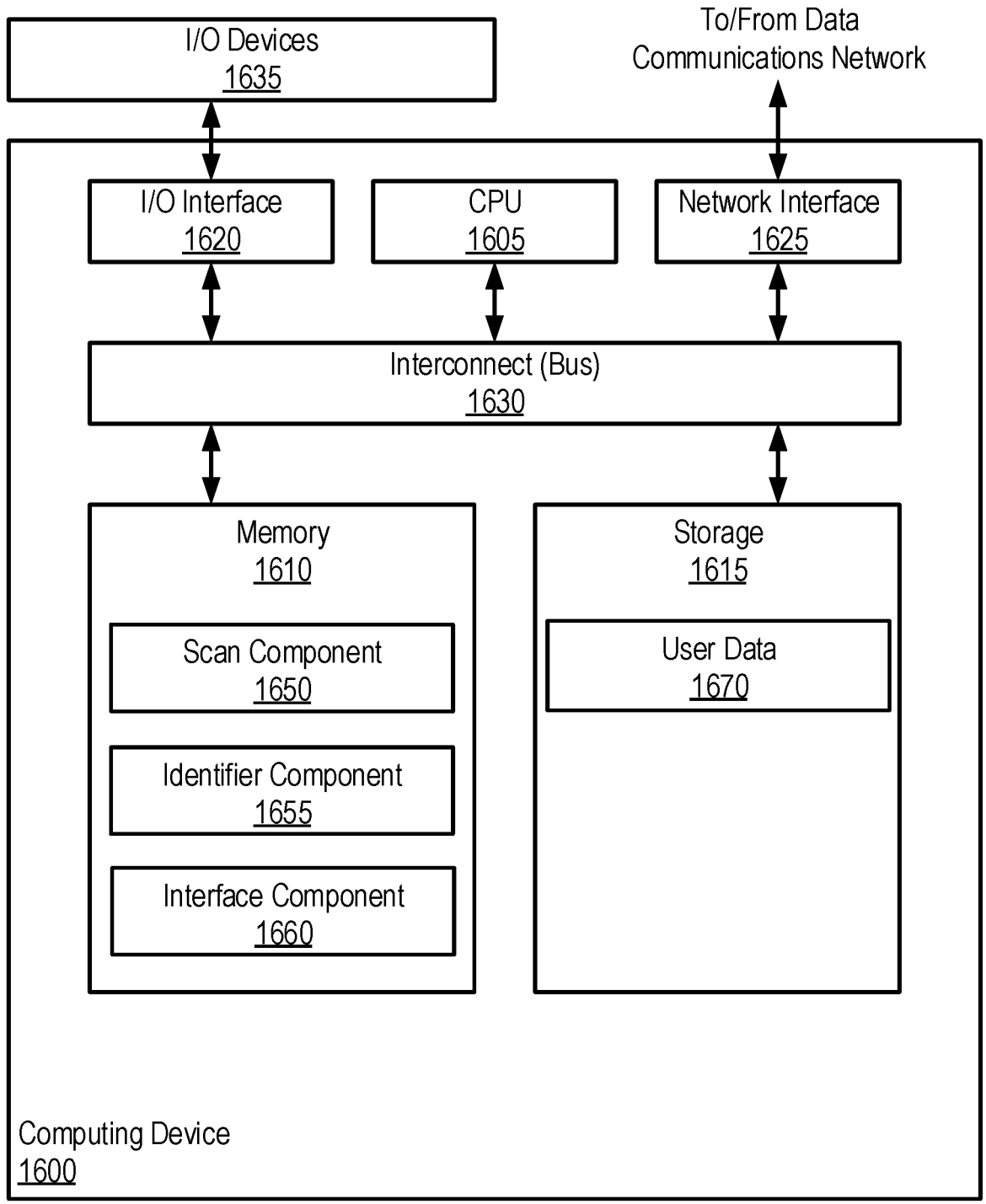
FIG. 16 depicts an example computing device configured to perform various aspects of the present disclosure.

FIG. 16 depicts an example computing device 1600 configured to perform various aspects of the present disclosure. Although depicted as a physical device, in embodiments, the computing device 1600 may be implemented using virtual device(s), and/or across a number of devices (e.g., in a cloud environment). In one embodiment, the computing device 1600 corresponds to a user device, such as the user device 110 of FIG. 1, user device 210 of FIG. 2, user device 310 of FIG. 3, user device 410 of FIG. 4, user device 510 of FIG. 5, and/or user device 610 of FIG. 6.

As illustrated, the computing device 1600 includes a CPU 1605, memory 1610, storage 1615, a network interface 1625, and one or more I/O interfaces 1620. In the illustrated embodiment, the CPU 1605 retrieves and executes programming instructions stored in memory 1610, as well as stores and retrieves application data residing in storage 1615. The CPU 1605 is generally representative of a single CPU and/or GPU, multiple CPUs and/or GPUs, a single CPU and/or GPU having multiple processing cores, and the like. The memory 1610 is generally included to be representative of a random access memory. Storage 1615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 1635 (such as keyboards, monitors, etc.) are connected via the I/O interface(s) 1620. Further, via the network interface 1625, the computing device 1600 can be communicatively coupled with one or more other devices and components (e.g., via a network, which may include the Internet, local network(s), and the like). As illustrated, the CPU 1605, memory 1610, storage 1615, network interface(s) 1625, and I/O interface(s) 1620 are communicatively coupled by one or more buses 1630.

In the illustrated embodiment, the memory 1610 includes a scan component 1650, an identified component 1655, and an interface component 1660, which may perform one or more embodiments discussed above. Although depicted as discrete components for conceptual clarity, in embodiments, the operations of the depicted components (and others not illustrated) may be combined or distributed across any number of components. Further, although depicted as software residing in memory 1610, in embodiments, the operations of the depicted components (and others not illustrated) may be implemented using hardware, software, or a combination of hardware and software.

In one embodiment, the scan component 1650 is used to detect or scan other devices, such as check-in sensors and terminals, as discussed above. For example, the scan component 1650 may detect unique identifiers of these devices, transmit a unique identifier of the computing device 1600 and/or of the user of the computing device 1600, and the like. The identifier component 1655 may generally be used to identify resident devices within range of the computing device 1600, as discussed above. For example, the identifier component 1655 may detect unique identifiers of resident devices (or of the resident associated with such devices), transmit a unique identifier of the computing device 1600 (or of the user) to resident deices, and the like. The interface component 1660 may be configured to retrieve and output resident profiles (e.g., from EHR servers), as discussed above. For example, the interface component 1660 may request resident data based on the output of the scan component 1650 and/or interface component 1655, and output some or all of the returned data via a GUI.

In the illustrated example, the storage 1615 includes user data 1670. In one embodiment, the user data 1670 may include attributes of the user, such as their employee ID, authorization or access permissions, login or other credentials, and the like. Although depicted as residing in storage 1615, the user data 1670 may be stored in any suitable location, including memory 1610.

Example Server System for Improved Data Services

Figure 17:
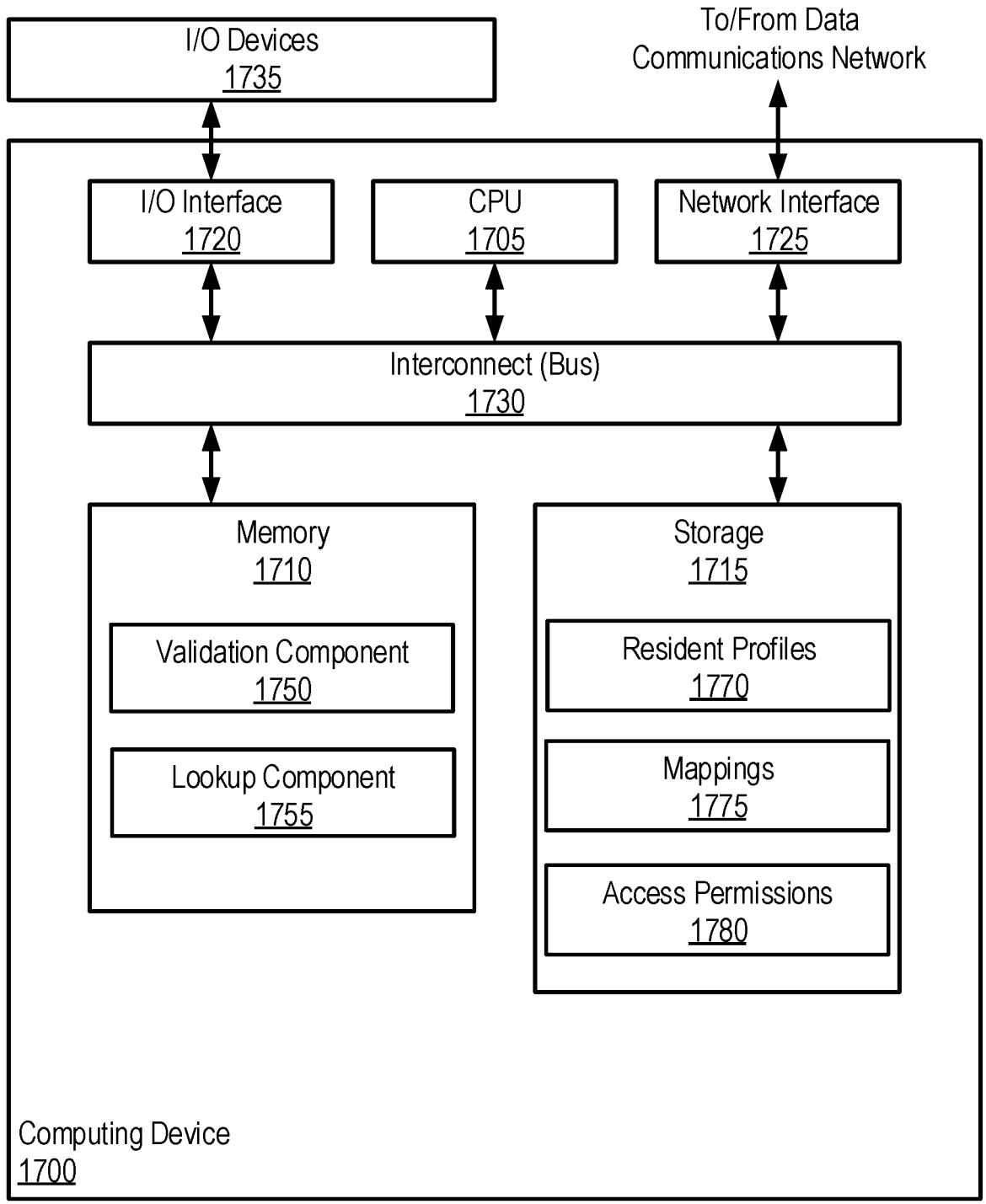
FIG. 17 depicts an example computing device configured to perform various aspects of the present disclosure.

FIG. 17 depicts an example computing device 1700 configured to perform various aspects of the present disclosure. Although depicted as a physical device, in embodiments, the computing device 1700 may be implemented using virtual device(s), and/or across a number of devices (e.g., in a cloud environment). In one embodiment, the computing device 1700 corresponds to a server, such as the EHR server 105 of FIG. 1, EHR server 205 of FIG. 2, EHR server 305 of FIG. 3, server 405 of FIG. 4, server 505 of FIG. 5, and/or server 605 of FIG. 6.

As illustrated, the computing device 1700 includes a CPU 1705, memory 1710, storage 1715, a network interface 1725, and one or more I/O interfaces 1720. In the illustrated embodiment, the CPU 1705 retrieves and executes programming instructions stored in memory 1710, as well as stores and retrieves application data residing in storage 1715. The CPU 1705 is generally representative of a single CPU and/or GPU, multiple CPUs and/or GPUs, a single CPU and/or GPU having multiple processing cores, and the like. The memory 1710 is generally included to be representative of a random access memory. Storage 1715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 1735 (such as keyboards, monitors, etc.) are connected via the I/O interface(s) 1720. Further, via the network interface 1725, the computing device 1700 can be communicatively coupled with one or more other devices and components (e.g., via a network, which may include the Internet, local network(s), and the like). As illustrated, the CPU 1705, memory 1710, storage 1715, network interface(s) 1725, and I/O interface(s) 1720 are communicatively coupled by one or more buses 1730.

In the illustrated embodiment, the memory 1710 includes a validation component 1750 and a lookup component 1755, which may perform one or more embodiments discussed above. Although depicted as discrete components for conceptual clarity, in embodiments, the operations of the depicted components (and others not illustrated) may be combined or distributed across any number of components. Further, although depicted as software residing in memory 1710, in embodiments, the operations of the depicted components (and others not illustrated) may be implemented using hardware, software, or a combination of hardware and software.

In one embodiment, the validation component 1750 is used to authenticate or validate user requests, as discussed above. For example, the validation component 1750 may confirm that the requesting user is authorized to receive the data, that the indicated scan or interaction was also reported by the indicated resident device, and the like. The lookup component 1755 may generally be used to identify the specific user and/or resident relevant for a given check-in or scan, as discussed above. For example, the lookup component 1755 may use one or more mappings to identify which resident it assigned to a given space or device, which user is associated with a given user device, and the like. For example, the lookup component 1755 may identify the relevant individuals for a given request, retrieve the requested resident profile, filter or extract relevant portions of the profile, and/or transmit the results to the requesting devices.

In the illustrated example, the storage 1715 includes resident profiles 1770, mappings 1775, and access permissions 1780. In one embodiment, the resident profiles 1770 may include attributes or characteristics, such as EHR, of one or more residents in a facility. The mappings 1775 can generally indicate the relationships between individuals and devices and/or spaces, such as which resident is assigned to each space, which resident devices are associated with each space and/or resident, which user is associated with each user device, and the like. The access permissions 1780 may generally indicate, for each user, what permissions they have (e.g., whether they can view data from one or more residents, whether they can modify data for one or more residents, and the like). Although depicted as residing in storage 1715, the resident profiles 1770, mappings 1775, and access permissions 1780 may be stored in any suitable location, including memory 1710.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or systems (e.g., the EHR server 105, 205, 305, 405, 505 and/or 605) or related data available in the cloud. For example, the EHR server could execute on a computing system in the cloud and automatically validate users and retrieve appropriate data. In such a case, the EHR system could identify users, residents, and patients, and store the EHR data at a storage location in the cloud. Doing so allows a user to access this information from any computing system attached to a network connected to the cloud (e.g., the Internet).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

Example Clauses

Implementation examples are described in the following numbered clauses:

Clause 1: A method, comprising: receiving a check-in scan indicating a user device in a medical facility; identifying a medical professional associated with the user device; identifying a patient of the medical facility based at least in part on the check-in scan; validating access permission of the medical professional, with respect to the patient, based at least in part on the check-in scan; in response to validating the access permission of the medical professional: refraining from requesting credentials of the medical professional; automatically retrieving a patient profile of the patient via one or more networks; and automatically storing input describing the patient, from the medical professional, in the patient profile via the one or more networks.

Clause 2: The method of Clause 1, further comprising: determining a recent context of the patient; and identifying relevant data, in the patient profile, based on the recent context; and automatically outputting the relevant data to the user device.

Clause 3: The method of any one of Clauses 1-2, wherein receiving the check-in scan comprises determining that the user device is within a defined proximity to the patient based on detecting the user device in a physical space assigned to the patient.

Clause 4: The method of any one of Clauses 1-3, wherein identifying the patient comprises: identifying a physical space associated with the check-in scan; retrieving a mapping of patients to physical spaces in the medical facility; and determining, based on the mapping, that the patient is assigned to the physical space.

Clause 5: The method of any one of Clauses 1-4, wherein identifying the patient further comprises: retrieving status information for the patient; and determining, based on the status information, that the patient is currently residing in the medical facility.

Clause 6: The method of any one of Clauses 1-5, wherein identifying the patient comprises: receiving, from the user device, an identification of a detected patient device; retrieving a mapping of patients to patient devices in the medical facility; and determining, based on the mapping, that the patient device is assigned to the patient.

Clause 7: The method of any one of Clauses 1-6, wherein identifying the patient comprises: receiving, from a patient device, an identification of a detected device; and determining that the detected device is the user device.

Clause 8: The method of any one of Clauses 1-7, wherein validating the access permission of the medical professional comprises confirming that the medical professional is authorized to care for the patient.

Clause 9: A system, comprising: a memory comprising computer-executable instructions; and one or more processors configured to execute the computer-executable instructions and cause the processing system to perform a method in accordance with any one of Clauses 1-8.

Clause 10: A system, comprising means for performing a method in accordance with any one of Clauses 1-8.

Clause 11: A non-transitory computer-readable medium comprising computer-executable instructions that, when executed by one or more processors of a processing system, cause the processing system to perform a method in accordance with any one of Clauses 1-8.

Clause 12: A computer program product embodied on a computer-readable storage medium comprising code for performing a method in accordance with any one of Clauses 1-8.

What is claimed is:

1. A method, comprising:
   receiving a check-in scan indicating a user device in a medical facility;
   determining a first timestamp indicating when the check-in scan occurred;
   identifying a medical professional associated with the user device;
   identifying a patient of the medical facility based at least in part on the check-in scan;
   receiving, from a patient device associated with the patient, an identification of the user device in proximity to the patient device;
   determining a second timestamp indicating when the identification of the user device occurred;
   validating access permission of the medical professional, with respect to the patient, comprising determining that the first and second timestamps differ by less than a threshold;
   in response to validating the access permission of the medical professional:
   refraining from requesting credentials of the medical professional; and
   automatically retrieving a patient profile of the patient via one or more networks;
   receiving, from the medical professional, user input describing the patient, wherein the user input does not explicitly indicate the patient;
   automatically storing the user input in the patient profile via the one or more networks without requesting the medical professional to explicitly indicate the patient.

2. The method of claim 1, further comprising:
   determining a recent context of the patient; and
   identifying relevant data, in the patient profile, based on the recent context; and
   automatically outputting the relevant data to the user device.

3. The method of claim 1, wherein receiving the check-in scan comprises determining that the user device is within a defined proximity to the patient based on detecting the user device in a physical space assigned to the patient.

4. The method of claim 1, wherein identifying the patient comprises:
   identifying a physical space associated with the check-in scan;
   retrieving a mapping of patients to physical spaces in the medical facility; and
   determining, based on the mapping, that the patient is assigned to the physical space.

5. The method of claim 4, wherein identifying the patient further comprises:

retrieving status information for the patient; and determining, based on the status information, that the patient is currently residing in the medical facility.

6. The method of claim 1, wherein identifying the patient comprises:
receiving, from the user device, an identification of a detected patient device;
retrieving a mapping of patients to patient devices in the medical facility; and
determining, based on the mapping, that the patient device is assigned to the patient.

7. The method of claim 1, wherein validating the access permission of the medical professional comprises confirming that the medical professional is authorized to care for the patient.

8. A non-transitory computer-readable storage medium comprising computer-readable program code that, when executed using one or more computer processors, performs an operation comprising:
receiving a check-in scan indicating a user device in a medical facility;
determining a first timestamp indicating when the check-in scan occurred;
identifying a medical professional associated with the user device;
identifying a patient of the medical facility based at least in part on the check-in scan;
receiving, from a patient device associated with the patient, an identification of the user device in proximity to the patient device;
determining a second timestamp indicating when the identification of the user device occurred;
validating access permission of the medical professional, with respect to the patient, comprising determining that the first and second timestamps differ by less than a threshold; and
in response to validating the access permission of the medical professional:
refraining from requesting credentials of the medical professional;
automatically retrieving a patient profile of the patient via one or more networks;
receiving, from the medical professional, user input describing the patient, wherein the user input does not explicitly indicate the patient;
automatically storing the user input in the patient profile via the one or more networks without requesting the medical professional to explicitly indicate the patient.

9. The non-transitory computer-readable storage medium of claim 8, the operation further comprising:
determining a recent context of the patient; and
identifying relevant data, in the patient profile, based on the recent context; and
automatically outputting the relevant data to the user device.

10. The non-transitory computer-readable storage medium of claim 8, wherein receiving the check-in scan comprises determining that the user device is within a defined proximity to the patient based on detecting the user device in a physical space assigned to the patient.

11. The non-transitory computer-readable storage medium of claim 8, wherein identifying the patient comprises:
identifying a physical space associated with the check-in scan;
retrieving a mapping of patients to physical spaces in the medical facility; and
determining, based on the mapping, that the patient is assigned to the physical space.

12. The non-transitory computer-readable storage medium of claim 11, wherein identifying the patient further comprises:
retrieving status information for the patient; and
determining, based on the status information, that the patient is currently residing in the medical facility.

13. The non-transitory computer-readable storage medium of claim 8, wherein identifying the patient comprises:
receiving, from the user device, an identification of a detected patient device;
retrieving a mapping of patients to patient devices in the medical facility; and
determining, based on the mapping, that the patient device is assigned to the patient.

14. A system comprising:
one or more computer processors; and
logic encoded in a non-transitory medium, the logic executable by operation of the one or more computer processors to perform an operation comprising:
receiving a check-in scan indicating a user device in a medical facility;
determining a first timestamp indicating when the check-in scan occurred;
identifying a medical professional associated with the user device;
identifying a patient of the medical facility based at least in part on the check-in scan;
receiving, from a patient device associated with the patient, an identification of the user device in proximity to the patient device;
determining a second timestamp indicating when the identification of the user device occurred;
validating access permission of the medical professional, with respect to the patient, comprising determining that the first and second timestamps differ by less than a threshold;
in response to validating the access permission of the medical professional:
refraining from requesting credentials of the medical professional; and
automatically retrieving a patient profile of the patient via one or more networks;
receiving, from the medical professional, user input describing the patient, wherein the user input does not explicitly indicate the patient;
automatically storing the user input in the patient profile via the one or more networks without requesting the medical professional to explicitly indicate the patient.

15. The system of claim 14, the operation further comprising:
determining a recent context of the patient; and
identifying relevant data, in the patient profile, based on the recent context; and
automatically outputting the relevant data to the user device.

16. The system of claim 14, wherein receiving the check-in scan comprises determining that the user device is within a defined proximity to the patient based on detecting the user device in a physical space assigned to the patient.

17. The system of claim 14, wherein identifying the patient comprises:
identifying a physical space associated with the check-in scan;

retrieving a mapping of patients to physical spaces in the medical facility; and determining, based on the mapping, that the patient is assigned to the physical space.

18. The system of claim 17, wherein identifying the patient further comprises:

retrieving status information for the patient; and determining, based on the status information, that the patient is currently residing in the medical facility.

19. The system of claim 14, wherein identifying the patient comprises:

receiving, from the user device, an identification of a detected patient device;

retrieving a mapping of patients to patient devices in the medical facility; and determining, based on the mapping, that the patient device is assigned to the patient.

\* \* \* \* \*